United States Patent [19]

Caci

[11] Patent Number: 5,392,223

[45] Date of Patent: Feb. 21, 1995

[54] AUDIO/VIDEO COMMUNICATIONS PROCESSOR

[75] Inventor: Joseph C. Caci, Owego, N.Y.

[73] Assignee: International Business Machines Corp., Armonk, N.Y.

[21] Appl. No.: 921,536

[22] Filed: Jul. 29, 1992

[51] Int. Cl.[6] .................................................. G06K 15/00
[52] U.S. Cl. ..................................... 364/514; 364/144; 364/146; 348/17
[58] Field of Search ................... 358/85; 364/514, 144

[56] References Cited

U.S. PATENT DOCUMENTS

| | | |
|---|---|---|
| 3,795,763 | 3/1974 | Golding et al. |
| 3,873,771 | 3/1975 | Kleinerman et al. |
| 4,394,774 | 7/1983 | Widerg et al. |
| 4,425,642 | 1/1984 | Moses et al. |
| 4,494,144 | 1/1985 | Brown |
| 4,541,008 | 9/1985 | Fishman et al. |
| 4,551,755 | 11/1985 | Matsuda et al. |
| 4,654,484 | 3/1987 | Reiffel et al. |
| 4,682,225 | 7/1987 | Graham |
| 4,720,745 | 1/1988 | DeForest et al. |
| 4,733,299 | 3/1988 | Glenn |
| 4,736,407 | 4/1988 | Dumas |
| 4,739,413 | 4/1988 | Meyer |
| 4,780,761 | 10/1988 | Daly et al. |
| 4,792,993 | 12/1988 | Ma |
| 4,797,750 | 1/1989 | Karweit |
| 4,825,434 | 4/1989 | Shaio |
| 4,849,811 | 7/1989 | Kleinerman |
| 4,858,026 | 8/1989 | Richards |
| 4,862,264 | 8/1989 | Wells et al. |
| 4,949,169 | 8/1990 | Lumelsky et al. |
| 4,955,048 | 9/1990 | Iwamura et al. |
| 4,995,071 | 2/1991 | Weber et al. ............... 358/85 |
| 4,999,831 | 3/1991 | Grace |
| 5,027,400 | 6/1991 | Baji et al. |
| 5,043,810 | 8/1991 | Vreeswijk et al. |
| 5,072,442 | 12/1991 | Todd ............................ 358/85 |
| 5,136,575 | 8/1992 | Kuroda ........................ 358/85 |
| 5,157,491 | 10/1992 | Kassatly ...................... 358/85 |
| 5,164,980 | 11/1992 | Bush et al. .................. 358/85 |

FOREIGN PATENT DOCUMENTS 119588 9/1984 Germany.

OTHER PUBLICATIONS

Telecommunications, vol. 25, No. 6, Jun. 1991, M. Grimshaw, "LAN Interconnections Technology," pp. 37-46 (the whole document).
IEEE International Conference on Communications ICC, '90, vol. 1, Sep. 3, 1990, pp. 134-139, Weiss, "Desk Top Video Conferencing—An Importance Feature of . . . ".

Primary Examiner—Ellis B. Ramirez
Assistant Examiner—Thomas Peeso
Attorney, Agent, or Firm—Eugene I. Shkurko; Lynn L. Augspurger

[57] ABSTRACT

A communications processor serves a group of several workstations with audio and video transmission processing for the purpose of providing video conferencing. The communication processor utilizes artificial intelligence software to read the connection. Conversion rules are contained in tables so that the system can react to the communications environment. The system is coupled for processing optical signals for low cost communication and video conferencing with audio and video communications within the facility area and for long haul transmission. The communication processor provides audio and video communications under instantaneous constraints of the transmission medium and instantaneous degree of loading or usage. Bandwidth, resolution and transmission rate are adjustable to fit the constraints at the time a request for service is made. A workstation initiates a request for service. A request for service includes data about the nature or type of service and signal destination. This information is sufficient for the communication processor to make several attempts to threads before an affirmative determination can be made. If an affirmative determination is not possible, then the communication processor will determine which is possible and provide an output to the user for possible changes in a request.

20 Claims, 8 Drawing Sheets

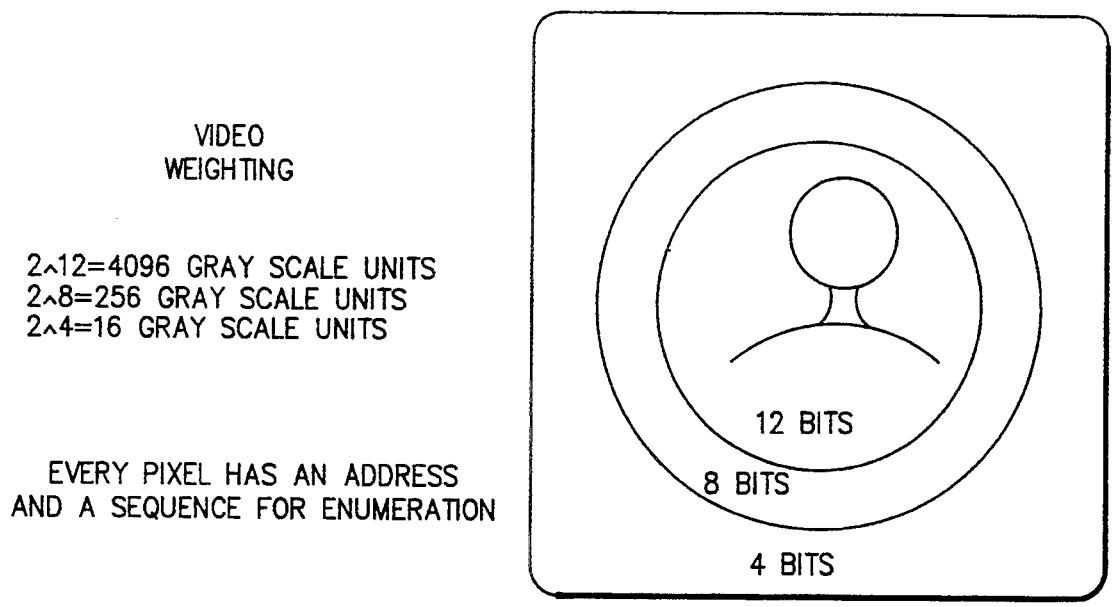

VIDEO WEIGHTING

2^12=4096 GRAY SCALE UNITS
2^8=256 GRAY SCALE UNITS
2^4=16 GRAY SCALE UNITS

EVERY PIXEL HAS AN ADDRESS
AND A SEQUENCE FOR ENUMERATION 101010101010 12 BITS FULL RANGE PER PIXEL AS AN EXAMPLE
--10101010-- 8 OF 12 BITS USING A SLIDING RANGE COMPRESSION
----1010---- 4 OUT OF 12 BITS USING A SLIDING RANGE COMPRESSION

FIG.3

FRAME PRIOR TO AGGREGATE ENCODING

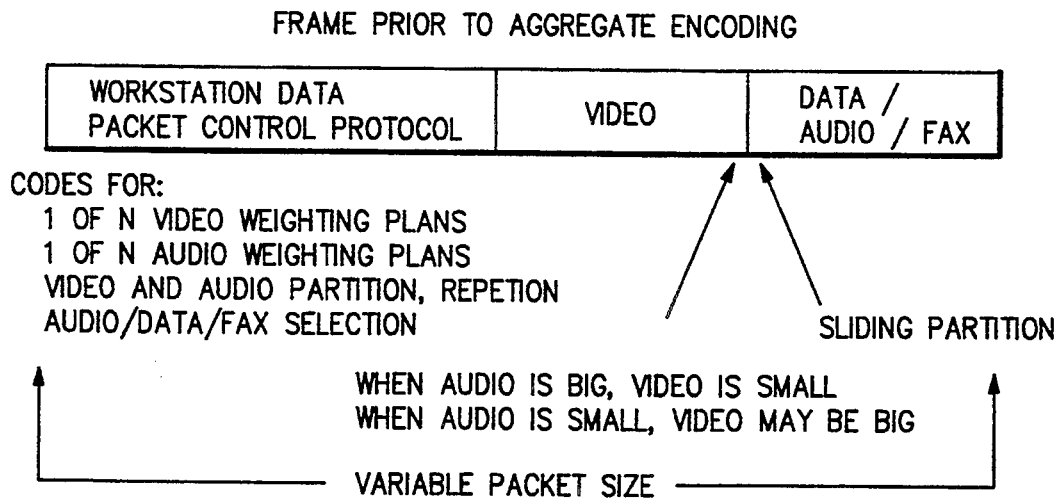

CODES FOR:
  1 OF N VIDEO WEIGHTING PLANS
  1 OF N AUDIO WEIGHTING PLANS
  VIDEO AND AUDIO PARTITION, REPETION
  AUDIO/DATA/FAX SELECTION

SLIDING PARTITION

WHEN AUDIO IS BIG, VIDEO IS SMALL
WHEN AUDIO IS SMALL, VIDEO MAY BE BIG

VARIABLE PACKET SIZE

PROTOCOL POINTS
  REDUNDANT INFORMATION IS NOT TRANSMITTED
  AUDIO USAGE IS INTERMITTANT (TASI)
  AUDIO BANDWIDTH CAN GIVE WAY TO VIDEO WHEN NOT IN DEMAND
  VIDEO FRAME RATE IS AVERAGED OVER SECONDS, (INVERSE TASI)

FIG.4

AUDIO/VIDEO COMMUNICATIONS PROCESSOR

FIELD OF THE INVENTION

This invention relate to an audio/video communication processor for field of telecommunications and computers and especially to those systems which serve a group of workstation equipped users with the means to communicate audibly and visually.

GLOSSARY OF TERMS

WEIGHTING—A method by which software identifies a group of binary numbers as having specific place; i.e. hundreds, thousands in decimal system; in a fixed binary number scheme.

COMPRESSION—A method by which software or hardware is used to generate codes which control substitution of long strings of binary data with one or more order of magnitude smaller replacement codes. The code may be in modulation format or binary data format.

PEL—A term to describe an element of video data which is digital in nature. A binary number which represents the range of luminosity, chrominance and hue in a digital video system. The smallest independent unit of visual acuity represented by a binary number on a display screen. Concatenation is of Picture ELement, from which PEL arises.

PIXEL—Another term for pel.

COMMUNICATIONS PROCESSOR—A term used to describe a new class of communications equipment which is used to connect workstation equipped users with the resources to video conference over telecommunications networks. It consists of several subprocessors which in aggregate form the communications processor. Concatenated form; communication processor.

PACKET—An assemblage of binary data on the network side of the communication processor which contains network and communication processor control information, video data, and audio data.

DACS—Digital Access Cross Connect, a machine for interchanging 64,000 bit per second time slots in either DS or non DS format between several T1 carriers independent of the signaling codes in the DS or T1 carrier. DS refers to DS1, DS2, or DS3 digital telephone channel coding formats. The basic rate of 64,000 bps may be a non telephone channel which could contain any type of binary data. T1 refers to the digital multiplex basic rate 1.544 Mbps which may or may not consist of 24 DS type digital telephone channels.

TASI—Time Assigned Speech Interpolation is a term that refers to compressing speech. Speech or properly digital voice is processed either according to mu-law or a-law weighting. One is a North American standard and the other is European. Other countries either use the North American or European or CCITT standard. International circuits are required to convert between the two as they are not compatible. TASI algorithms read the data and eliminate data which represents voice silence so only the actual speech sounds are transmitted. Additionally TASI may insert codes for certain known patterns of voice data which offers additional compression. The bandwidth thus saved is used for other purposes.

Artificial Intelligence (AI)—Is a software program which reacts to and causes events to occur based on a set of rules. The rules are not hard and fast necessarily. They are generally soft rules such as instructions given to a neophyte. A crucial characteristic of these rules is that they cover all possible events, even those of low probability. They cover the permutation of events in any combination that is possible. The objective in formulating these rules is not to allow a situation with inadequate or impossible reactions to the external stimuli.

Pleisochronous—A characteristic of two or more clocking circuits such that, once a synchronizing process is performed and withdrawn, they remain synchronized for long periods of time. A solar day would be a minimally acceptable long period of time.

BACKGROUND OF THE INVENTIONS

As background for the invention, I will mention a few patents and then turn to other works which relate to products having some elements which may be relevant to a product made using my invention. U.S. Pat. No. 4,949,169, issued Aug. 14, 1990 to LUMELSKY, and assigned to International Business Machines Corp., describes an interface architecture for interconnecting a number of video display devices together over a high speed digital communication link having limited bandwidth. The interface architecture at each display node provides for transmitting sequential pixels of data composed of separate Y and C fields from a digital TV source in each node representative of a scaled video window. Audio information is transmitted with the video on portions of the network bandwidth not used by the video. It is an object of this invention to provide a hardware system which allows use of existing hardware in the various video display devices and associated communications adapters such that minimum additional control hardware and software is required.

U.S. Pat. No. 4,780,761, issued Oct. 25, 1988, to DALY et al and assigned to Eastman Kodak Company related to a device which recognizes that human visual system is less sensitive to diagonally oriented spatial frequencies than to horizontal or vertical ones. The transceiver has a way of quantifying the transform coefficients according to the model of the human vision system. This system is not designed to video conference workstations over the telecommunications network. It does not time share a video subprocessor as part of a audio/video communication processor and it does not function in a network control manner and hence cannot network.

U.S. Pat. No. 4,494,144, issued Jan, 15, 1985, to BROWN and assigned to AT&T describes a reduced bandwidth video transmission with good video presence. The bandwidth reduction is accomplished by dividing the video picture of the camera into segments by determining the activity level within each segment and by transmitting the signal of each segment with a resolution level which is related to the activity level within the segment. The most active segment is transmitted at the highest resolution while other segments are transmitted at lower resolutions. This system is not designed to video conference workstations over the telecommunications network. It does not time share a video subprocessor as part of a audio/video communication processor and hence cannot network.

U.S. Pat. No. 4,862,264, issued Aug. 29, 1989, to WELLS and assigned to British Broadcasting Corporation describes a method of coding a video signal for transmission in a restricted bandwidth by subdividing a frame of picture information into a set of constituent blocks, measuring the amount of picture activity in each block, sampling the information in each block at a rate related to the amount of picture activity in that block, and adding to the coded block a supplementary signal indicating the rate used for that block. A decision is made for each block to transmit at full accuracy or reconstruct it from the previous frame. In effect each block is sampled twice simultaneously. The first sampling is at a substrate and the second sampling is at the Nyquest rate. a block activity generator and motion activity generator are used to make decisions on transmitting the high accuracy or low accuracy. The samples may be transmitted in analog or digital form.

U.S. Pat. No. 4,654,484, issued Mar. 31, 1987, to REIFFEL and assigned to INTERAND CORP describes an improved apparatus for rapidly compressing, expanding and displaying broad band information which is transmitted over narrow band communications channel. A video image is cyclically assembled in low resolution and high resolution phases from digitized data representing gray level intensity for individual pixels which have been grouped into pixel. During the initial cycle of the low resolution phase, a representative sample of cell intensity values is transmitted by a sending station to a receiving station according to a video compression routine. The receiving station then used a video expansion routine to calculate an intensity value for those pixels whose intensity values were not transmitted and displays an initial image.

U.S. Pat. No. 4,682,225, issued Jul. 21, 1987 to GRAHM, and assigned to NASA, describes a method of, and apparatus for, telemetry adaptive bandwidth compression. An adaptive sampler from a video signal generates a sequence of sampled fields. Each field and it's range rate information are sequentially transmitted to and stored in a multiple adaptive field storage means. The patented apparatus may be used in spacecraft docking systems wherein vast amounts of video information and data must be transmitted in limited finite bandwidth. This invention is suited for space communication systems from a spacecraft of both video and data signals. In particular, a manual signal can control parameters such as range rate, sampling ratio, number of low resolution frames of video simultaneously displayed or portion of the down link communicati bandwidth allocated between data and video.

While this patent has little relationship with the preferred application of my invention, it will be noted that this sophisticated system may be significantly improved in my invention. During a video conference, a user may request reinitializing at any time. My communication processor also processes for recognition of degraded transmission data and automatic reinitializing. My communication processor controls reinitializing so as not to disrupt the existing channel bandwidth allocation among the users.

U.S. Pat. No. 4,739,413, issued Apr. 19, 1988 to MEYER, and assigned to LUMA TELECOM, describes a method of video optimized modulator demodulator with adjacent modulating amplitudes matched to adjacent pixel gray values. Each modulating symbol has a one to one correspondence with a particular pixel value of brightness. U.S. Pat. No. 3,795,763, issued Mar, 5, 1974 to GOLDING, and assigned to COMSAT CORP, describes a method of digital television transmission system for transmitting at substantially reduced bit rate and bandwidth. Frequency interleaving techniques reduce the sampling rate and digital differential PCM with edge recoding techniques reduce the number of bits per sample. Further reduction in bit rate is accomplished by eliminating about half the color data and all the sync pulses from the transmitted signal. Periodic sync words are transmitted to allow reconstruction of sync information. Transmitted bits are multiplexed in accordance with a particular format which provides proper alignment of the luminance and chrominance lines at the receiver. The Y & C are separated and sampled at less than the Nyquest rate. The samples are quantified and converted into difference samples having further bit reduction. The audio is sampled at the horizontal scan rate and the digital representations of audio and video are serially multiplexed into an output stream. Every other pair of C is completely eliminated from the multiplexed serial bit stream but is reconstructed at the receiver from adjacent C information.

U.S. Pat. No. 5,043,810, issued Aug. 27, 1991 to VREESWIJK, and assigned to US PHILIPS, describes a method of improved transmitting or recording an improved video signal processing apparatus and an improved receiving apparatus of a television signal. The method of processing is spatial and or temporal consistency control of a selection relating to spatially and or temporally neighboring parts of the image. The decision process includes neighboring parts of the image that may or may not have an effect on the part being processed. A block of pixels constitutes a part of the image and is sampled in accordance with a sampling pattern not corresponding to that operation and which block adjoins a block which is sampled with a sampling pattern corresponding to that operation, to the corresponding sampling pattern.

U.S. Pat. No. 4,720,745, issued Jan, 19, 1988 to DEFOREST, and assigned to DIGIVISION Inc., describes a method and apparatus for enhancing video displays. An NTSC composite video signal is dematrixed and its RGB components are digitized into a $512 \times 512$ frame pixel array. One high resolution frame is generated from each input frame. The subpixel values for a given pixel are derived by examining the nearest neighboring pixels and using enhancement algorithms represented by data in lookup tables. Signal to noise rations are handled by comparing and deciding to change the value of a pixel based on the value of the nearest neighbors or replace it with the median of it and its neighbors.

U.S. Pat. No. 4,858,026, issued Aug. 15, 1989 to RICHARDS, and assigned to US PHILIPS, describes a method of coding an image to be displayed. The image is coded using data compression which consists of first obtaining pixel information as a first matrix of high resolution. A second matrix of lower resolution is devised like the first through low pass filtering. A third matrix is the difference between the two. A fourth matrix is produced by sub-sampling the second matrix, (not every pixel is used). The third and fourth matrices are coded complementary decoding consists in restituting the second matrix and combining the restituted second matrix by interpolation filtering the decoded fourth matrix and combining the restituted second matrix with the decoded third matrix. This method has applications such as compact disk image encoding, but my communication processor does not work accord the principles set forth in this patent.

U.S. Pat. No. 4,733,299, issued Mar. 22, 1988 to GLENN, and assigned to NYIT, describes a method for conversion of interlaced scanned video signals to progressive scanned video signals. The applicant has learned that motion adaptive processing is not required. Low resolution information is obtained from the current interlaced field and the remaining detailed information is obtained from a stored signal that includes a prior field or fields. Only the detail signal is obtained from prior fields and since human vision does not as quickly perceive motion of high spatial frequencies, there will be little if any, perceived motion artifacts.

U.S. Pat. No. 4,551,755, issued Nov. 5, 1985 to MATSUDA, and assigned to PIONEER ELECTRIC CO, describes a method of bandwidth correcting system for a television tuner. A bandwidth control voltage is applied to a bandwidth adjusting circuit provides a passband width which is determined by the relative levels of a video intermediate frequency signal and an audio intermediate frequency signal. This patent seems to imply that the transmission process will over modulate, or exceed the allocated bandwidth for an instant from time to time and that a correcting signal will cause the receiver to recognize this condition and adjust.

The communication processor has a different application, process and method than described in U.S. Pat. No. 4,551,755. However the concept of bandwidth correcting and bandwidth allocation must be differentiated. A bandwidth allocation from video to voice or the reverse, does not necessarily need to be made and if it is made, it is not for the purpose to correct a malfunction such as over modulation, but rather to manage both types of bandwidth.

U.S. Pat. No. 4,792,993, issued Dec. 20, 1988 to MA, and assigned to CAPETRONIC (BSR) Ltd., describes a method of improved TVRO (TeleVision Receive Only, usually refers to TV by satellite). The improvement is in automatic filtering the audio signals to a frequency range of the band outside that of the modulated video signal, combining the filtered audio signals and the video signal and transmitting such signals through the restricted bandwidth channel. At the distant end the reverse process separates the signals into audio and video.

U.S. Pat. No. 4,849,811 issued Jul. 18, 1989 to KLEINERMAN and assigned to KLEINERMAN describes a method for simultaneously sending audio and video signals over standard telephone lines or other channel having restricted bandwidth which comprises obtaining a video image, digitizing the image, modulating a signal with the digitized image, obtaining audio signals and filtering the audio signals to a frequency range of the band outside that of the modulated video signal, combining the filtered audio signals and the video signal and transmitting such signals through the restricted bandwidth channel. At the distant end the reverse process separates the signals into audio and video.

The communication processor has some elements in common with this patent such a digitizing the video and processing it digitally, but it improves on it by combining the audio and video together into a continuous channel frame separated only by software protocol. U.S. Pat. No. 4,849,811 separates the audio and video in the restricted bandwidth frame by modulating the video and audio separately. The communication processor does not use a telephone channel. Instead, it uses a digital trunk, the smallest of which is 64,000 serial bits per second. The long distance carriers can provide this as trunk capacity or leased lines of which 64,000 serial bits per second provides minimal video conferencing service. Best performance is obtained with high bandwidth network carriers.

U.S. Pat. No. 4,425,642, issued Jan. 10, 1984 to MOSES, and assigned to APP SPEC TECH Inc., describes a method of co-channel communications system which permits a digital data signal to be simultaneously transmitted within a communications medium signal such a telephone voice or television video. The data signals are converted to very low multifrequency signals consisting of fundamental frequencies and harmonics which span the communications bandwidth. The data signal is spread spectrum modulated, its energy content is spread over the entire band causing a small degradation in signal to noise by adding what appears to be pseudo noise to the audio or video signal. Since the data signals coherently produce the pseudo noise it is detected coherently and removed from the audio or video at the receiver.

The communication processor does not perform spread spectrum modulation, nor does co-channel data with voice or video. Rather the communication processor uses a protocol to keep audio, video, and data in a serial transmission channel.

U.S. Pat. No. 3,873,771, issued Mar. 25, 1975 to KLEINERMAN, and assigned to TELSCAN, describes a system for simultaneously transmitting a video and audio signal through the same transmission line using FM slow scan TV while the audio signal is transmitted by AM single sideband technique. Both the video and audio occupy the channel at the same time in separate frequency regions. My communication processor need not use any analog modulation techniques, or frequency multiplexing techniques or slow scan FM TV techniques.

U.S. Pat. No. 4,797,750, issued Jan. 10, 1989 to KARWEIT, and assigned to J. HOPKINS U., describes a method and apparatus for transmitting a recorded computer generated display simultaneously with the transmission of audio and or video signals. A computer generates a series of codes from which an image may be derived, the resolution of which is not dependent on the recording transmission medium. These codes are supplied to a first modem through an RS-232 communications line. The first modem converts these codes to into image bearing audio tones. The audio tones are input in the left audio channel of a video recorder. Simultaneously, aural information is picked up by a microphone and input into the right audio channel while a video camera provides video signals to the video channel of the recorder. On playback the audio in the left channel is decoded by the modem and reconverted back to computer generated display. My communication processor does not perform spread spectrum modulation, nor do use a RS-232 communications line. Instead, I illustrate a different kind of use of a modem.

U.S. Pat. No. 4,736,407, issued Apr. 5, 1988 to DUMAS, and assigned to US ARMY, describes a method of audiographic conferencing system between two or more users either directly connected or through a bridging device over voice grade telephone lines. Each user has a personal computer, software and a smart modem, cassette player/recorder and speaker phone. They are connected as shown in FIG. 1. The smart modems listen for a bauded signal, if present decode it and pass it to the computer, the speaker phone allows the user to listen to speech while being under software control. The cassette recorder/player is used for unattended operation.

The communication processor differs from this patent in that video conferencing performed by this patent, rather computer data and voice is conferenced.

U.S. Pat. No. 4,955,048, issued Sep. 4, 1990 to IWAMURA, and assigned to SHARP Kabushiki Kaisha, describes a method for multiplexing the transmission of audio and video signals, the video signal is separated into a luminance (Y) and a chrominance (C) signal. The Y signal is then modulated and the C signal is balanced modulated with a low frequency carrier. The resultant C modulated signal is converted to a lower frequency. The audio signal, frequency modulated Y signal and frequency converted C signal are multiplied by frequency division to be transmitted across a telephone cable.

U.S. Pat. No. 4,999,831, issued Mar. 12, 1991 to GRACE, and assigned to UNITED TELCOMM Inc, describes a method of digital transmission of wideband video, narrowband audio, and digital information over information networks. It describes synchronous quantitized subcarrier multiplexing which results in electronic multiplexing of voice, data and multiple channel full bandwidth NTSC video for digital transmission over communication line and recovery processing. The channels to be multiplexed must be carefully chosen for frequency content so as not to interfere with each other, then the signals are low pass filtered and modulated with local reference signals (Double Side Band Suppressed Carrier DSBSC) and consequently form baseband, midband and high band channels which are combined and input into a D/A converter. This results in a serial bit stream known as quantitized-SCM. This patent is unlike the present invention.

U.S. Pat. No. 5,027,400, issued Jun. 25, 1991 to BAJI, and assigned to HITACHI Ltd, describes a multimedia bidirectional broadcast system. The main control unit receives information over a network from subscriber stations. Software in the main unit decodes the request from the subscriber station and provides the service by controlling all transmission processes. The service may be a motion picture or a commercial data base. Transmission also includes bandwidth compression on a video signal. This system is described as providing a broadband ISDN broadcast system, and to provide CATV with means for using a limited number of cable channels.

My communication processor differs from this patent in that the patent is designed for interactive advertising on ISDN broadband networks where shoppers can see video images of the product and interact with the master station to perform transactions. This patent is also applicable to CATV systems where customers can order video programming services selectively rather than having technicians hard wire customer requested programming services. My communication processor intended to do workstation video conferencing.

U.S. Pat. No. 4,541,008, issued Sep. 10, 1985 to FISHMAN, and assigned to JONES FUTURA FOUNDATION Ltd., describes a television signal transmission system incorporating circuits for processing and encoding a repetition reduced signal. The system separates the video components and generates sampled digital values of the color, intensity components and puts them in a storage buffer. A data processor compares successive samples of the component video data from which it generates variable length blocks of video data to represent slowly varying signals or rapidly varying signals. There is circuitry for encoding and multiplexing audio and synchronizing data into the signal stream, circuitry for encoding signal and control data for transmission to a receiver and a circuit at the receiver for reversing this process. The process of reducing repetition is to use variable velocity scanning by using codes to indicate when color, intensity, and luminance information is repeatable. When information is repeatable, only every eighth sample is transmitted. Timing information to control the scan rate is crucial. The orderly progression of the line scan now depends on circuits to make up the rate tag with interpolation data. My communication processor on the other hand reduces repetitious video data.

U.S. Pat. No. 4,394,774, issued Jul. 19, 1983 to WIDERGREN, and assigned to COMPRESSION LABS Inc, describes a method of digital video compression and expansion system and the methods for compressing and expanding digital video signals in real time at rates up to NTSC color broadcast rates. The system compressor receives digital frames and divides them into subframes, performs a single pass spatial domain to transform domain transformation in two dimensions of picture elements. The resultant coefficients are normalized and compressed using a predetermined ratio. There is an adaptive rate buffer to control feedback for compression. The compressor adaptively determines the rate buffer capacity control feedback component in relation to instantaneous data content of the rate buffer memory in relation to its capacity, and it controls the absolute quantity of data resulting from the normalization step so the buffer is never empty or full. In practice, the color picture is divided into luminance, and I and Q chrominance components. The luminance component is compressed and expanded with the scene adaptive coding rate buffer feedback technique. The I and Q components are given simple spatial low pass filtering followed by spatial subsampling with dimensional interpolation at the system receiver. The audio is filtered and sampled at a fixed rate and muxed together with bit screen synchronization codes and transmitted as a serial bit stream.

ADDITIONAL BACKGROUND AS TO OTHER PRODUCTS

During the detailed description which follows the following works will be referenced as an aid for the reader. These additional references are:

These additional references are incorporated by reference.

1) Article in Apr. 1, 1991 issue of PC Week Journal on Page 43 entitled "Analysts Expect Video Meetings to Boom in 90's" by Michael Zimmerman. Industry experts prognosticate growth in video conferencing as a form of communication.

2) Stanford Computer Optics Inc. 3530 Sugarberry Lane, P.O. Box 31266, Walnut Creek Calif. 94598, makes a product called "4 Quick" that is an image acquisition device that makes 30 to 60 frames a second with variable delay to make a 512 by 512 low light image. It operates between the wavelengths of 130–920 nm and can make a frame in as little as 5 ns. This device would be applicable for making image frames for several users in a time share arrangement.

3) Welch Allen Inspection Systems Division. 4619 Jordan Road, Skaneateles Falls, N.Y. 13153 makes a product called a "VP3 Videoendoscope". A small video probe, miniature video imaging camera slightly larger than a fountain pen makes the image and sends it along an umbilical cord back to a device where the image is compressed and modulated for transmission onto a telephone line at speeds from 14,400 bps to 2,400 bps. This device represents a possible integration into a display bezel.

4) Dialogic, 300 Littleton Road, Parsippany N.J. makes a "Call Processor" and "Audiotex" Information program for voice messaging and automated attendant telephone network services. It uses interactive voice response as a key feature for centralized dictation services. This product is representative of the kinds of voice compression and processing achievable.

5) Telephote Communications, 11722-D Sorrento Valley Road, San Diego Calif. 92121, makes an image compression product called "ALICE" that performs 15 to 1 compression with no loss of resolution. It is a software device and is designed to integrate into other products such as Teleconferencing, Picture Data Base and Surveillance. It claims to be able to send full color images over standard phone lines in less than 10 seconds, or store 4,000 high resolution color images on a 50 Mbyte hard disk. This product is representative of the kinds of compression levels achievable.

6) Dataproducts New England, Barnes Park North, Wallinford Conn. 06492, makes a product called "DPMUX M-44". This device accepts channel input from a telephone switch using E & M signaling or data in baseband format from a digital device into a port. The voice signals are then converted to digital voice of the required bit rate or in the case of data, retimed to network timing and assigned a time slot on the aggregate network transmission side. The aggregate side is either frational or whole T1 service. This machine is configurable by an operator for the number of channels, bit rate assignment, timing assignments (asynchronous, synchronous, plesiochronous), and class of voice service. The concept of configurable by an operator and down loaded by aggregate frame to the distant end is extendable to automatic configurable generation by a controling algorithm, down loaded by an aggregate frame to the distant end.

7) Network transmission equipment made by various manufacturers have functions that are applicable to the communication processor. These functions are time slot interchange or Digital Access Crossconnect Service (DACS) machines, and Time Assigned Speech Interpolation machines ( TASI, voice data as an instantaneous bandwidth variable) such as the IDNX product from Network Equipment Technologies, 800 Saginaw Drive, Redwood City, Calif. 94063. This class of equipment fits data and voice in an adjustable format to make efficient use of the available bandwidth. This class of equipment is described as a transmission resource manager. The concept of managing transmission resources is applicable to the communication processor for the purpose of workstation video conferencing.

8) Feature article published in the February 1991 issue of Telecommunications, The article is entitled "Steamlining Protocols" by William Stalling. The article discusses changes to transmission protocols for streamlining and improving transmission performance. The communication processor will use an adaptive protocol that will allow it to communicate with multiple type electronic digital transmission equipments to facilitate transmission control for the purpose of workstation video conferencing.

9) Feature article published in the February 1991 issue of Telecommunications. The article is entitled "LAN Interconnections Technology" by Michael Grimshaw. The article discusses the differences between bridges, routers, repeaters and switches as used in local area networking and interfaces to the transmission network. The communication processor will perform network functions of bridging, routing, repeating and switching.

10) Internal Telegraph and Telephone Consultative Committee (CCITT) IX Plenary Assembly—Document 52, Study Group VII—Report R43, Recommendation X.200 entitled REFERENCE MODEL OF OPEN SYSTEMS INTERCONNECTION FOR CCITT APPLICATIONS. This is also referred to as the 7 layer ISO model. The application-process as referred to in this document is considered video conferencing as performed by the communication processor.

SUMMARY OF THE INVENTIONS

My invention can be used for telecommunications networks, with different channels and different tariff offerings to which my communications processor interfaces for and on behalf of the workstation users to provided the requested video conferencing services.

A workstation needs to communicate with other workstations with operator audio and video intelligence. A picture or video of the operator with audio would greatly enhance personal productivity by significantly improving person to person communications. The objectives of this disclosure are:

1) Propose a low cost simple video interface approach from the workstation to the Communication-Processor. There is more than one solution for this element of design, however only one needs to be shown.

2) Propose a simple video weighting algorithm that will give a perception of high quality without the need of high bandwidth. There is more than one weighting algorithm that would satisfy a weighting requirement. Since the weighting plan is proportional to transmission bandwidth and inversely proportional to display performance, the communication processor will select the appropriate weighting plan that gives the best performance under existing conditions. The use of an algorithm for selection of weighting algorithm selection is important.

3) Propose an audio management algorithm that would include the use of several weighting standards that would allow the CommunicationProcessor to be compatible over several standards, permitting connection to various types of network circuits. The plan takes into account the type of service requested and service required at the distant end. It will make a selection based on a match between the two. This selection then becomes a criteria for item 2.

4) Propose a network management algorithm for dynamic multiplex transmission on hierarchical T carriers down to the DS0 level, fiber optic media standards like SONET and FDDI. The DS0 level is the lowest common denominator for an audio/video channel because communications evolution requires compatibility with existing standards and DS0 is a predominate type interface. A key function of the communication processor is to assemble audio and video onto a small fraction of a T1 carrier as a minimum. When bandwidths permit higher carrier rates, the communication processor will use higher carrier rates.

5) Artificial Intelligence (AI) for the system controls the final processing after using the transmission network as an input base for processing decisions. Factors such as connectivity, and activity are some of the criteria used to evaluate the possibility of connections. To these type factors are added user requests for service, capabilities of the workstation, and distant end user availability.

In order to achieve the above purposes, I have provided a system for coupling workstation units in a system which transmits audio and video information over a carrier, which has a communication processor having a digital bus for intercoupling elements coupled to the communication processor. The communication processor's network interface ports include a port for a network carrier signal and a port for a local loop carrier signal. The communication processor interconnects the various units on the network. A workstation interface, video processor and audio processor are interconnected to pass digital and analog signals therebetween and for passing digital information via the system digital bus. In control of the system, I have provided a channel frame processor connected to said digital bus for controlling communication over said digital bus. In addition on the system bus I have provided a statistical audio/video multiplexing processor connected to the digital bus for dynamically allocating bandwidth between audio and video information signals on the digital bus.

My audio processor has a voice compression/weighting subprocessor shared by several users coupled to the communication processor system. In addition it has a way to perform compression and weighting based on an allocatable bandwidth provided by a user of the system and based upon a decision made by the communication processor to allocate final bandwidth process control for the requested bandwidth.

My video processor has a video compression/weighting subprocessor shared by several users coupled to the communication processor system. This provides for compressing video information and subject to control from the communication processor based on video activity and allocatable bandwidth and weighting provided by a user of the system and based upon a decision made by the communication processor to allocate final bandwidth process control for the requested bandwidth.

My system is provided with a statistical audio/video multiplexing processor shared by several users of the system for performing modelling of the communications channel and usage situation and computing parameters for channel transmission in the system. The channel frame processor may be coupled to be shared among users for assembling a channel frame for insertion into an aggregate frame.

Further I have provided a composite super frame processor common to all users, one per port for implementing a language of the telecommunications interface.

The audio video communication processor system can execute artificial intelligence (AI) software common users to which all other system processor elements are subservient for synthesizing implementation parameters of digital language modulation conversion from one channel in an aggregate frame to reproduce the channel in another aggregate frame and for setting up conditions of facsimile usage, for threading channels to establish connections between system elements for connection of workstations operation with said system.

These and other features will be described in connection with the following drawings.

BRIEF DESCRIPTION OF THE DRAWINGS

The communication processor must do the same kinds of things as the transmission equipment and at the same time add to those functions audio and video processing, it becomes a new class of equipment. In the telecommunications lexicon, a DCE is Data Communications Equipment, that which belongs to the telecommunications company. The DTE is the Data Terminal Equipment, that which belongs to the user of the telecommunications company's services. The distinction of DCE or DTE is applied to equipment as such. Since this is a new class of equipment, market place usage will ultimately determine if it is a DTE or DCE because it has elements of both. FIG. 1 is called AUDIO VIDEO COMMUNICATIONS PROCESSOR, NEW MACHINE CLASS.

FIG. 3 shows how a video weighting plan may be constructed for presentation as shown in the display area of FIG. 2.

FIG. 4 shows a channel frame consisting of three types of data. The figure is entitled FRAME PRIOR TO AGGREGATE ENCODING.

DETAILED DESCRIPTION OF THE INVENTIONS

Figure 1:
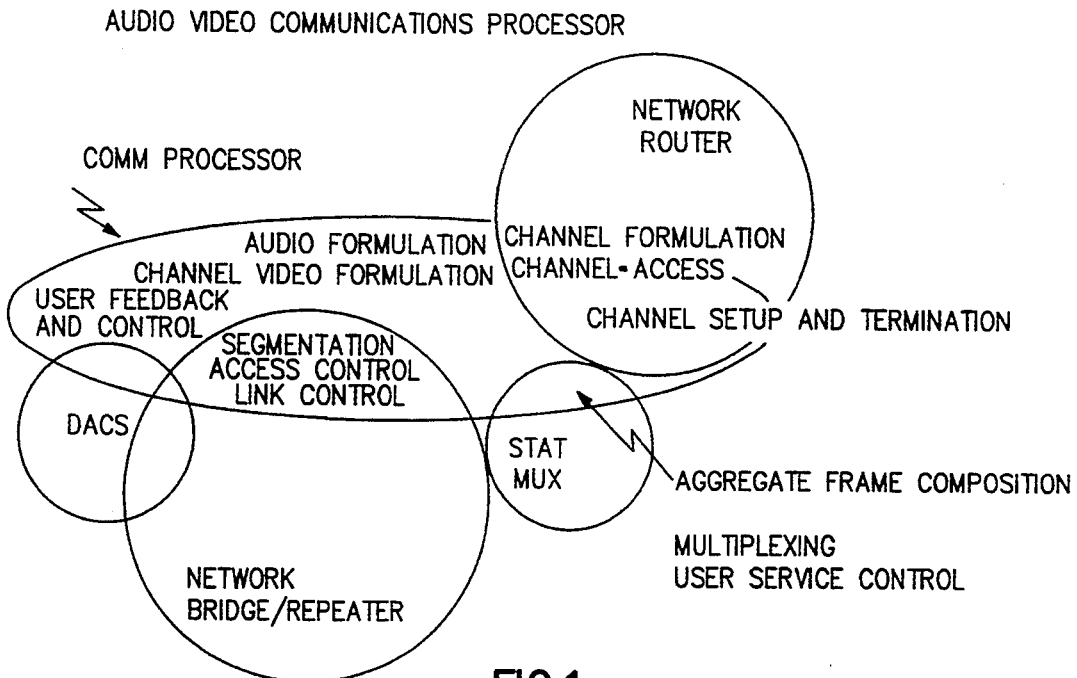
FIG. 1 shows the various classes of transmission equipment in Venn diagram format. The intersection of the circles represent the transmission equipment, and the ellipse the communication processor. Since the communication processor m with various type network equipments employed by the network carrier to provide the tariff service, it must be able to select the appropriate algorithm with all its advantages and constraints. The communication processor must then use advantages and work within the constraints to formulate the channel packet according to the user requested service.

Before considering our preferred embodiments in detail, it may be worthwhile to illustrate, by way of example, how the communication processor would function. A user (#1) at a workstation decides to request a video conference session with another user (#2). The user is at the same facility but in another building. Number 1 brings up a menu on the screen. The menu is interactive with a mouse (mouse: for the sake of argument) so that the user clicks on the "Who is Who" user directory. From there he selects the name of the individual he wishes to have a session with. The name is associated by list to a routing directory. The user also selects the size of the window for the receive video. The names in the directory window are associated with and mapped into the routing directory. Since the communication processors associates a route to user number 2 the communication processor associates a network port, and telecommunications network interface (ISO levels) for that port. The communication processor then tests the port for available bandwidth, queues the request in a jobs to do list and goes back to the user at the workstation with suggested window sizes.

Tagged to the window size is a high fidelity symbol. The high fidelity symbol represents voice quality which is the trade off to window size. As the user varies the size of the window from small to large, the high fidelity symbol varies from large to small. The video window is composed of two parts: one part is size and the other part is speed. The speed at which the video is updated is represented by rotating wheels, (motion picture camera reels). The communication processor controls the speed of the wheels by telling the workstation high range for window and speed that can be allowed at this time. The workstation through the applications software works the symbols and proportions them from a low value up to maximum. The faster the wheels spin the more natural the video, the slower the spin the less natural. Experience will guide the user to an acceptable value.

The communication processor will then initiate the session. This consists opening a channel to the other communication processor and forwarding a request for service. The first communication processor has determined that bandwidth is available. The second communication processor must determine if a second user #2 is available.

The improved video processing of the hardware system which is being described does, like U.S. Pat. No. 4,862,264, allows the processing of video in blocks for the purpose of identifying activity of the block to make a decision as to transmit at full accuracy or reduced accuracy. The improvement allows one to always transmit at reduced rates to accommodate the next potential user. The reduced rates do not necessarily effect video quality if redundancy rather than information is eliminated in the transmission selection process. Thus, unlike U.S. Pat. No. 4,862,264, the system allows the decision making process to be based on pixel numerical dynamic range. Video is always transmitted as binary numbers. The number of binary symbols per picture element is fixed by the A/D process, but the number of bits transmitted and their position in the number field is initially determined by the communication processor based on available bandwidth. The communication processor may elect not to transmit video but to devote the bandwidth to audio or data. The user may or may not notice any change to video quality as the intent is to reduce bandwidth requirements at the source by a controlled field of view and feedback controlled illumination.

I should note that my communication processor may be used to improve results in areas like that of U.S. Pat. No. 3,795,763. I use memory to hold successive video frames and perform difference algorithms between them. Then it performs further processing, differently than what is described in the U.S. Pat. No. 3,795,763. One example of differences is that pulse sync information is not transmitted because the workstation video hardware on the other end may have different video characteristics than the transmitting workstation. However, one should recognize that my communication processor processes workstation video, not the normal television signals.

After the second communication processor has determined that user #2 is available the processor proceeds.

Each workstation can set receive status. If a workstation is busy doing an application and the user has set receive status to "NO" then the communication processor will deny access to the first communication processor with a busy reason. User #1 is also informed. If user #2 has set receive status to "YES" then a query comes through on the screen. If the user responds positively to the query before a predetermined amount of time has elapsed, then a session is initiated. The parameters for workstation #2 are those of workstation #1, so both have the same fidelity and window size. The sessions can also be customized so that user number 2 with a higher performance workstation can have a larger or better quality video window. The customized parameters are set by the user again through menus. The reply to a receive status also includes information about the size of the window defined in a customized list, if available.

This is a simple case because the second user was at the same facility although in different buildings. In a situation such as this, it is expected that the telecommunications network might not be used, but rather a dedicated optical or wire cable with FDDI type bandwidths. If the second user was not co-located with the first then the telecommunications network then becomes the vehicle for carrying the traffic. In this second situation there are more interactions with more types of machines. The communication processors most likely will communicate through intermediaries. The communication processor must be able to speak the proper language such as 2B1Q, or AMI at the physical (reference ISO, CCITT X.200; x. etc) level and up through the network layer.

The communication processor can act as an intermediary between two other communication processors wishing to communicate. This is a required function because as yet there are no transmission equipment that can interact with the communication processor for purpose of providing video conferencing. In a situation where a communication processor acts as network equipment, it may be called on to do routing or bridging between two separate transmission circuits. The communication processor may be required to translate from 2B1Q to AMI as an example. The rules for the translation are embedded in the artificial intelligence software. Where rules do not exist, the communication processor will not attempt a route or bridge. This area is exceeding complex and no further explanation is attempted in this document.

Cost is a major factor in the decision to implement new technologies. The cost of providing video and audio communications from workstations can be significantly reduced by providing a common communication processor to serve several users. The cost is reduced by using the processing power present in workstations for display, and control. The communication processor is not in to compete against Token Ring or Ethernet Local Area Networks (LANs) but rather perform a different service by providing low cost audio and video communications within the facility area and for long haul transmission. The purpose of the communication processor is to provide the best quality audio and communications possible given the time variable constraints of the transmission medium and instantaneous degree of loading or usage. The communication processo not rely on specific standards for audio or video, rather the bandwidth, resolution and transmission rate are adjustable to fit the constraints at the time a request for service is made.

A workstation initiates a request for service. The user does this by brining up on the screen a software driven menu. The menu parameters are determined by the communication processor. When the parameters are chosen, they become in aggregate a request for service. A request for service includes data about the nature or type of service and signal destination. This information is sufficient for the communication processor to attempt several routing threads before affirmative determination can be made. If an affirmative determination is not possible, then the communication processor will determine what is possible and suggest those possibilities to the user.

The main concept of this design is the integration of several disciplines using a system engineering approach. Through the judicious adherences to multiple communication standards and application of advances in high speed signal processing, optics and light wave processing, a low cost communications processor is feasible.

THE PREFERRED EMBODIMENT

Turning now to our invention in greater detail, it will be seen from FIG. 1 that illustrates our preferred embodiment in which the communication processor is specified for processing workstation audio and video using artificial intelligence techniques to use the telecommunications network. It is this use of the telecommunications network that will allow for the first time a simple effective means for personal video conferencing. The communication processor is collection of existing technologies, improved and modified to work together, toward a common goal. The most important functions are network type and shown in FIG. 1. The evolution of the network has been towards increasing bandwidth. This has been true for some time, however there has also been an evolution toward providing digital bandwidth type services in which the customer interfaces the network at various layers. Typically referred to as ISO or International Standards Organization seven layer structure, the lower layers have been specified for basic control of network equipments for access to the physical, data link, network, and transport network functions. The ISO specification for access to physical, data link, and network are embedded in the communication processor particularly the AI, for communicating to those elements network that provide these functions. Beginning with the transport layer and ascending, the communication processor will communicate only to other communication processors to provide this function. Although it may be possible at a latter time to structure the transport layer portion of the communication processor to work with telecommunications network equipment at higher layers, for now the lower physical, data link, and network layer functions are embedded in the artificial intelligence portion of the communication processor. The three lowest layers, using definitions of the CCITT are designed into the communication processor for communicating to telecommunications network equipment. Furthermore the functions assigned to these layers are employed by artificial intelligence software.

The communication processor basic components are:

1) Voice Compression/Weighting Subprocessor shared by several users. The algorithm chosen is based on allocatable bandwidth. This sharing is vital because it provides for key bandwidth process control together with the communication processor.

2) Video Compression/Weighting Subprocessor shared by several users. The compression algorithm and weighting process are subject to control from the communication processor based on voice activity and allocatable bandwidth. The subprocessor works in conjunction with component 1, the audio subprocessor.

3) Video Imaging Device (may be embedded in the bezel). Works with the communication processor through the interface boardset for the workstation and associated software.

4) Voice Encoding Processor (may be embedded in the bezel). Provides digital voice capability at either 64,000 bits per second PCM or 32 or 16 Kbps ADPCM or LPC bidirectionaly or full duplex.

5) Statistical Audio/Video Multiplexing Processor shared by several users. This function is driven by AI software in the communication processor. It essen performs modeling of the communications channel and usage situation. It computes parameters for the channel and aggregate processor. This is the processor that makes use of collected data such as error free seconds for changing error correcting codes for the purpose of minimizing overhead.

6) Channel Frame Processor may be common or may be shared among users. Part of the communication processor responsible for assembling the channel frame for insertion into the aggregate frame. It implements the results of the statistical audio/video multiplexing processor. This function is driven by AI software in the communication processor 7) Composite Super Frame Processor common to all users, one per port This function is driven by AI software in the communication processor. This processor implements the language of the telecommunications interface such as FDDI, 2B1Q or AMI or such types.

8) CommunicationProcessor running artificial intelligence (AI) software common to all users, and for which all other processors are subservient to. This processor is responsible for synthesizing implementation parameters of digital language modulation conversion from one channel in an aggregate frame to reproduce the channel in a another aggregate frame. It is also responsible for setting up conditions of facsimile usage.

Where as the products described in Reference items 2 through 5 are independent (not related), this effort undertakes to define a specification between them. But not in a unique product sense but rather in a specific functional sense. These products represent what is achievable with current technology. Given what is available, the communication processor can be developed from these or similar kinds of products.

Items 6 and 7 are made to relate in a unique way, with the exception that TASI equipments have has their objective to increase the apparent transmission bandwidth by allowing more voice channels to be assigned to a digital carrier, than those allowed by fixed multiplexing schemes. For example the T-1 carrier carries 24 fixed channels of 64,000 bps, but if it was TASI'ed then it could carry as much as 32 or more channels. Service quality is degraded by TASI and data transmissions are seriously impaired. The space or inactivity periods associated with speech is used to transmit extra capacity voice channels. The aggregate frame structure contains the information at the distant end to reconstruct the voice channels in proper order. The difference is that a fixed 8 bits used to encode the voice signal is dynamically reduced from 8 down low as 4 depending on the dynamic range and activity. When bauded data is substituted for voice, the TASI algorithms cause enough signal distortion noise that data is destroyed. Hence it is incumbent on users to know how their data circuits are handled by the telecommunications carriers.

Circuits bought under a specific tariff may not necessarily be used for other purposes. The communication processor fits into this category. Since AI coding is specific for each tariff circuit, no substitutions can be made. A communication processor port designed for ISDN (2B1Q) B channel cannot be substituted for a 128,000 bps channel from a T-1 programmable multiplexer, even though the nominal rates are the same.

First Element of Distinction, Network Architecture

Several workstations are connected to the communication processor for the purpose of providing video conferencing. The video conferencing may be local in origination and destination or remote in destination. Remote destinations require a communication processor and workstation set up similar but not identical to the originating units. Workstations on the same communication processor can video conference as well. The workstation runs software to perform several tasks in conjunction with the communication processor. These five tasks are:

1) Prompt the user for the type of service to be attempted through the use of menus. The information to be gathered is of two kinds:

a) General class of video service desired such as window size, and low to high refresh rates.

b) General class of audio service desired such as low to high audio clarity and none to one second delay.

Associated with the window size is a high fidelity symbol. The high fidelity symbol is an icon of a gramaphone. The high fidelity symbol represents voice quality which is the trade off to window size. As the user varies the size of the window from small to large, the high fidelity symbol varies from large to small. The video window is composed of two parts: one part is size and the other part is speed. The speed at which the video is updated is represented by rotating wheels, (motion picture camera reels). The video symbol is a motion picture camera with reels on top of a box, and lens to one side of the box. The side of the camera is a box which is variable in size in which the receive video will be located. The communication processor controls speed of the wheels by telling the workstation the high range for window and speed that can be allowed at this time. The workstation through the applications software works the symbols and proportions them from a low value up to maximum. The faster the wheels spin the more natural the video, the slower the spin the less natural. Experience will guide the user to an acceptable value. If sufficient bandwidth is available there may be little or no interaction between the high fidelity symbol, reels and window size. If bandwidth is small, a small movement will cause a very large interaction quickly. The communication processor controls the size of the symbols at all times and the user cannot request or cause an impossible service. An impossible service would be all video and no voice or the reverse or any situation not programmed into the artificial intelligence software.

Audio service also requires some attention. As part of the trade in audio quality, fidelity is traded with video quality. Inherent in this trade is the synchronization of voice with the video. The communication processor will always attempt to sync voice with video. But inherent in the speed of the reels is the synchronization of voice with video. The communication processor will permit one second of difference between voice and video synchronization.

2) Prompt the user for the telephone number associated with the remote end workstation. Video conference routing uses telephone numbers along with specific names and passwords and time based call acceptance criteria. The communication processors communicate this information among themselves in the super frame in order to establish connection instruction tables. The telephone numbers are important because there is a large investment in the telephone number data base. The communication processors are programmed with the identity of each user service. This information is actively shared among communication processors. Part of this information is the users receive status. The communication processor will not attempt a call if the receive status is set negative. Since the communication processor network is an important part of user directory, the "Who is Who" directory first starts out with a geographic map showing locations of user concentrations. A software controlled hook onto one of those locations will bring up the names and telephone numbers of users at that point. There will also be a receive status indicator to keep users from wasting effort. This information is shared among communication processors using idle Super Frame aggregate capacity.

Second Element of Distinction, Workstation Video Specifications

Figure 2:
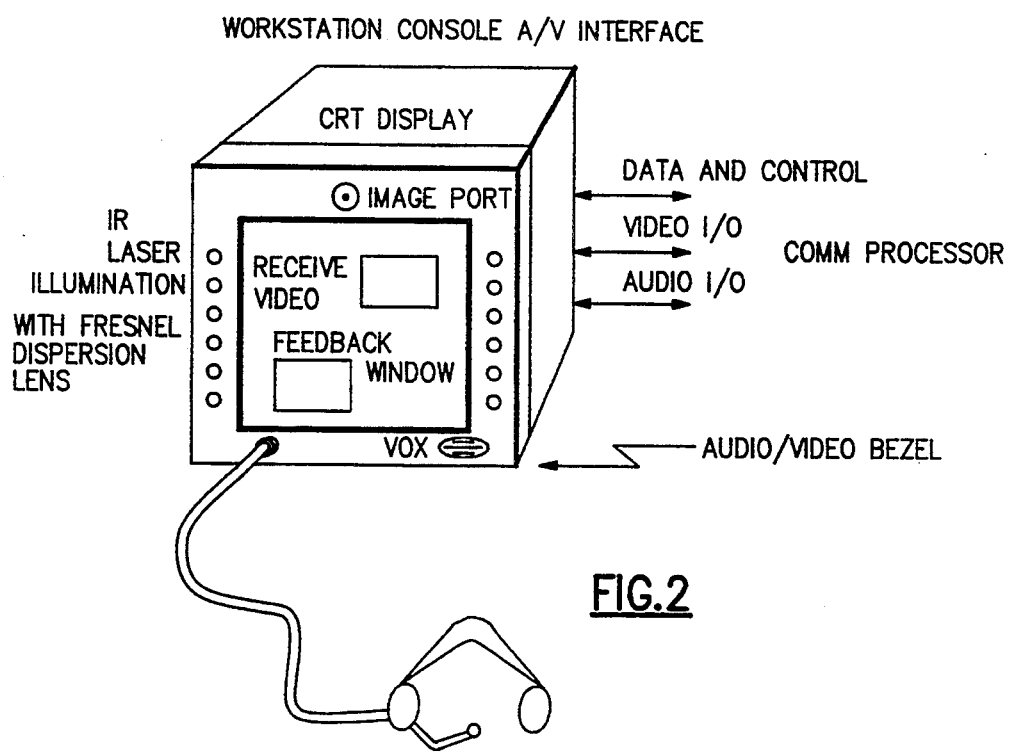
FIG. 2 shows the communication processor interface at the workstation level. It consists of a bezel which contains the electronics to make the forward video, and process transmit and receive voice, receive the feedback and distant end video. It communicates with the communication processor with control data and receives data for the user interface such as menu selections, and session data. Implied, but not shown are the software and interface adapter card which cause the workstation to interface the communication processor. The bezel does not interface the communication processor directly.
Figure 5:
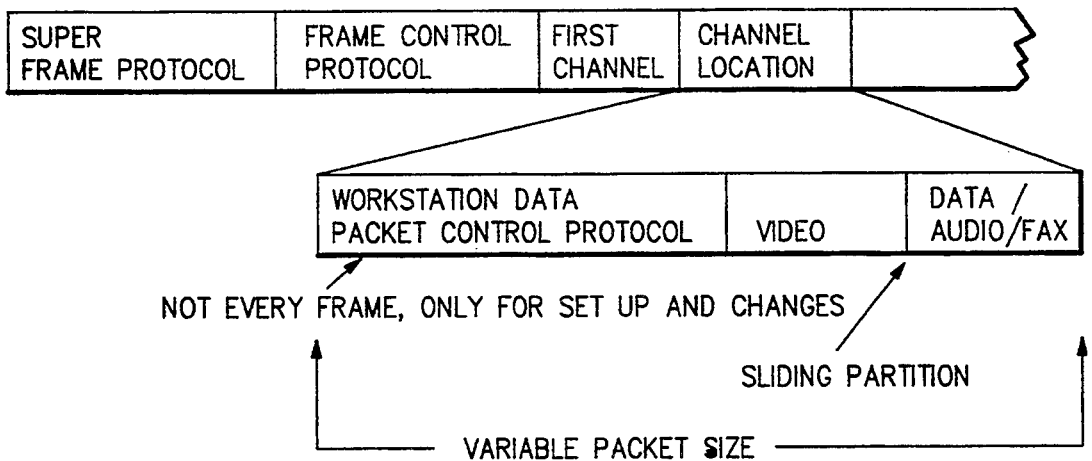
FIG. 5 shows the data output structure on the aggregate port of the communication processor. This figure is entitled SUPER FRAME SCHEMATIC

An approach, with potential for low cost, is to split the camera function of optics and electronics for the purpose of locating camera electronics at the Communication Processor. A basic camera to convert image to signal contains two essential components, focusing optics and image conversion electronics. Such a camera may be implemented by using focusing optics in conjunction with a fiber optic focal plane image collector located at the Communication Processor. The purpose of this approach is to use one set of high speed electronics to service multiple users. If the imaging device is fast, then it can service several users simultaneously. At the Communication Processor, the weighting algorithm and multiplexing algorithm can be applied simultaneously. FIG. 2 entitled Workstation Video Input shows the interface between a video collection circuits located at the workstation location. The imaging lens and video collection system is something on the order of an Videoendoscope or modification thereof. To keep the depth small, the primary lens can be designed to interface a right angle mirror. The mirror will allow the required focal length to be obtained along the width of the bezel. This way the bezel depth can be made small. The imaging device or electronic focal plane is then at right angles to the image. There is also the possibility that electronic focal plane need not be present in the bezel, but located in the communication processor. The imaging lens and collection system then transmits the image in optical form in optical guide to the communication processor. Both techniques will work, but when implementation cost is considered, the electronic focal plane in the bezel would seem to be the preferred approach, but the second approach is further developed in the alternative approach section.

Figure 10:
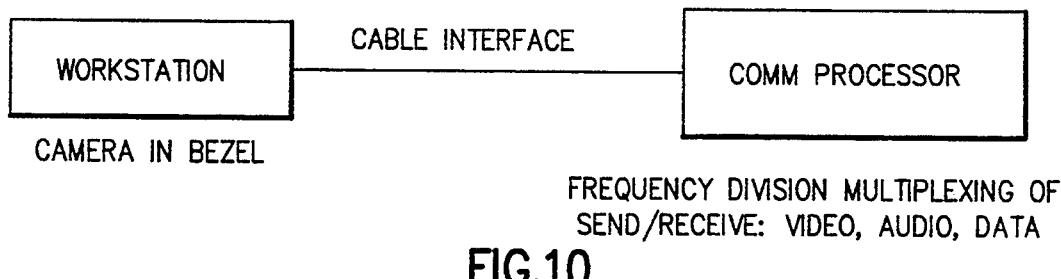
FIG. 10 illustrates a single wireline cable interface, between the workstation and the Communication Processor, of limited bandwidth but sufficient to support simple frequency division multiplexing of send and receive audio, video, and data.

Returning to the preferred approach, consider the possibility of a conventional approach using a miniature camera device such as that in item 3 in a bezel located at the workstation display. In this case a single wireline cable is all that is required for the interface between the workstation and the Communication Processor. The bandwidth of an average RF type cable is sufficient to support frequency division multiplexing of send and receive video, audio, and data. FIG. 10 shows that when this approach is used, the interface to the communication processor is simplified con the other types of signals that share the cable.

Figure 11:
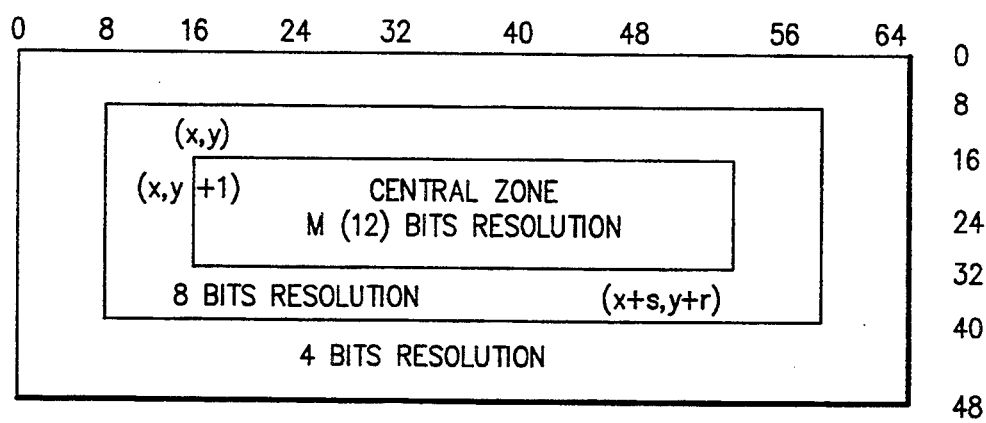
FIG. 11 is an extension of FIG. 3 with the addition of vertical and horizontal line numbers. The numbers shown are taken from IBM's VGA graphics specification. But the purpose of the figure is to stress, since each workstation is required to use a window, and a window is a fraction of a total viewing screen, that the bandwidth is related to video specification not driven by it. Furthermore, two disparate graphics specifications can video conference.

One key to the invention is the video processor weighting algorithm required to preserve picture quality and conserve transmission bandwidth. Compression is required in addition to weighting. Compression and weighting are not mutually exclusive, but must be designed together for compatibility. Consider the following; if an image is divided up into scan zones with a unique central zone defined as the area where the eye spends more than 50% of the time focused, and a unique concentric peripheral zone is defined as the area where the pupil spends 35% of the time focused. The remainder concentric peripheral zone is the remainder 15%. FIG. 11 is a graphical representation of an applicable weighting scheme.

The image frame which consists of $N \times J$ number of vertical and horizontal scan lines is digitized into M bits of resolution. For the sake of example, M is represented by the numerical value 12, and $N=J=525$ picture elements. Then each picture element is represented by 12 bits of resolution. The total number of bits is (N*J*M) or 3145728 bits. At this rate, a serial channel running at the rate of 1.544 Mbps would require just over 2 seconds to transmit If compression is able to reduce this value by 15 times, then the value is 209715. The first video frame is transmitted as compressed only as there is no prior frame to compare to. The next frame is weighted against the first by subtracting it from the previous frame, in a picture element by picture element comparison. If the resultant value is less than some predefined delta amount, the resultant is zero for that picture element. The position of the first picture element not equal to zero is noted as (x,y) of (N,J). The position of the next picture element at location $(x\pm,y+1)$ should also be non zero. Sigma, is the deviation computed from the next r scan lines of non zero picture element comparisons where r times s is about 50% of the central portion of the picture, and 50% of the total number of picture elements maximum or less if computed so. Therefore (x,y) to (x+s,y+r) is the central portion of the picture. But to compute a starting point for transmission of 12 bit numbers, x— is used for the starting row value and y is chosen for the column value. The last value in this sequence is x+s and y+r.

The total number of bits is then (256*256*12) or 786432 bits maximum value or less if comparisons produce zero values before 50% of the central portion of the picture occurs first. If compression is applied next, then the maximum number of bits is reduced by magnitude 15 (average compression possible) to 52,428. Since we pick DS0 as the base carrier rate 11,570 Bps is available for voice and overhead. FIG. 11 shows a possible weighting algorithm.

Once in digital format, video weighting is applied. In this algorithm the assumption is that the video is 640 pels by 480 pels, but could be any number. The combined number of pels is 307,200. Of this number, by arbitrary definition, 50% are given 12 bits of resolution, 35% are given 8 bits of resolution, and 15% are given 4 bits of resolution. The 12, 8 and 4 were chosen to exaggerate the weighting description for purposes of providing a clear explanation of the concept, there could be several such values used by the communication processor. The picture is transmitted in gray scale with the portion showing 4096 shades, and 256, and 16 shades for the remaining portions. Each area is compressed using image compression algorithm with boundary dependency.

Compression factors of 50 to 100 to one are possible in real time, but are not required in real time for the communications processor. Video may presented as series of images updated at some rate proportional to the request, bandwidth cost and system loading condition of service. Of keen impedance to user acceptance is the video signal to noise ratio. To enhance the signal to noise at the source, a technique is shown using low power laser in the short to medium shod IR wavelength region to illuminate the subject.

Figure 6:
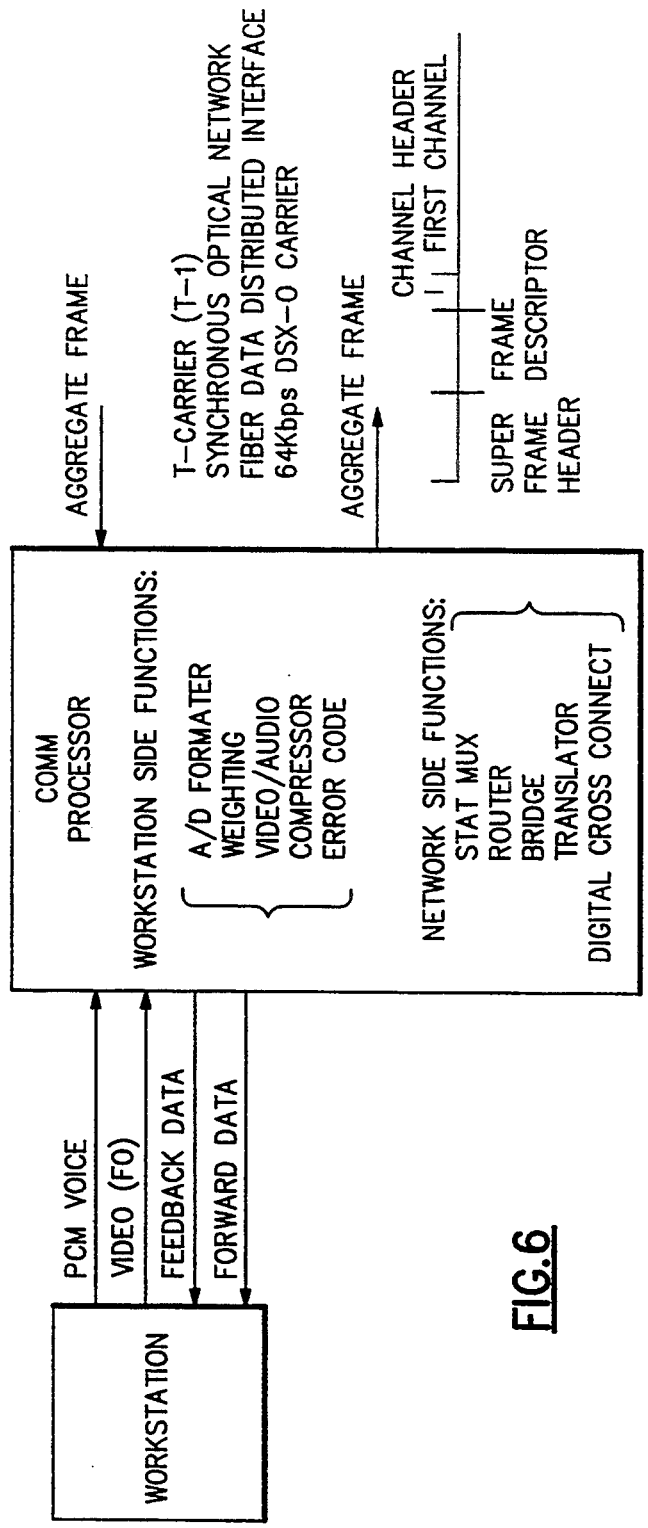
FIG. 6 shows communication processor high level functions and interfaces. It can be entitled COMM PROCESSOR FUNCTIONAL DIAGRAM. As shown, this is the preferred functional embodiment. Looking towards the workstation, the communication processor would seem to be a DTE. On the Network side are network connections called Aggregate Ports. Out of each port an Aggregate Frame is transmitted. Each aggregate frame contains the channel frames from the workstations. A channel frame may come in on one port which does not have a destination at this point, but would be routed, or bridged back on to another port for another destination. The information required to do this must return back to the originating communication processor for proper set up and coordination.
Figure 8:
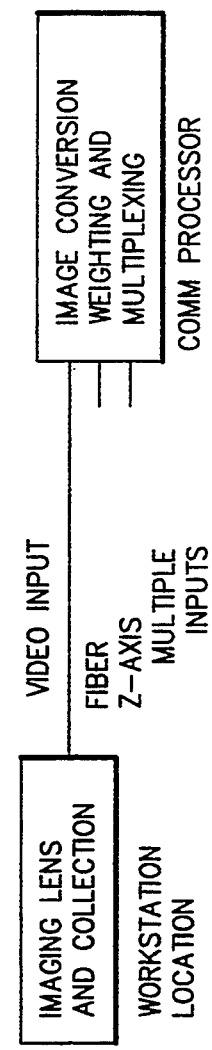
FIG. 8 shows a unique image processing scheme that can be applied to the communication processor.

Illumination using fresnel lens dispersion is a good way to maintain a high photometry value while maintaining a low radiometry level. It is recognized that subject eye safety can be assured if the radiometry can be kept low by virtue of the fresnel dispersion lens. At the same time, the detector frequency response should be as wide as possible, from visible to medium short wave length IR. FIG. 6 shows the detector frequency integration scale illustrating the effect of integrating all the wavelengths shown. In practice, imaging systems do not try and control illumination except in the broad sense of having enough light to make a good image. The spectral content and short term behavior play an important part of image processing. The goal of image illumination is to eliminate illumination vagrancies such as power line AC characteristics, and florescent lighting blue/green spectral content that would tend to create more image processing work for the communication processor. Office illumination dependent on AC power and florescent type lights for the primary source.

Figure 12:
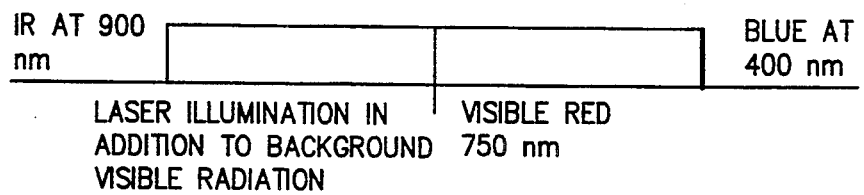
FIG. 12 shows an idealistic bandpass frequency response of a focal plane image detector. Part of the video processing is the integration of frequency from low frequency limit to high limit into a single value representing the pel. The image is entitled DETECTOR FREQUENCY INTEGRATION SCALE.
Figure 13:
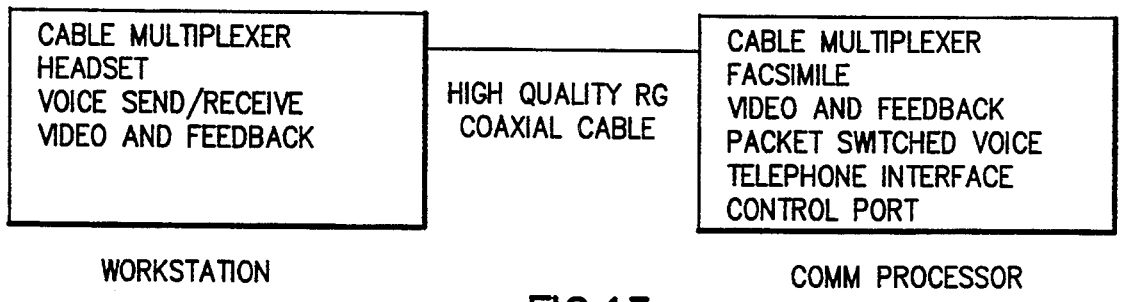
FIG. 13 shows the types of signals that would be interfaced between the communication processor and the workstation using the base technique shown in FIG. 10. The FIGURE is entitled COMM PROCESSOR AUDIO INTERFACE. The purpose of this FIGURE is to show that complex multiplexing, or fiber optic arrangements are not required to perform this function. Simple frequency division multiplexing on limited bandwidth RG cable is sufficient.

The integration of the amplitude over the frequency bandwidth will result in a signal with a high signal to noise value. This signal is reproduced at the distant end as a black and white gray scale video. Strictly speaking white is not a monochromatic color, but in this case can be considered such because it is a single value (area under the curve of FIG. 12) function of amplitude only. This approach was simplified for space and time reasons. It is recognized that the final signal is a convolution of the source illumination function, fiber optic band pass response, and the detector bandwidth.

Third Element of Distinction, Audio Management Specification

Figure 7A:
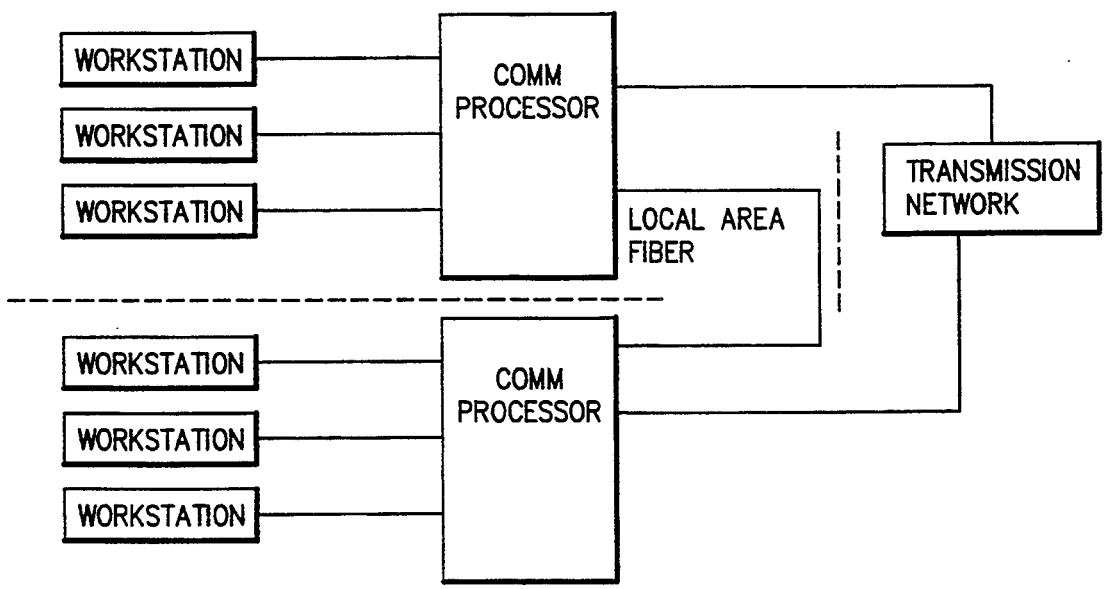
FIG. 7A shows the basic concept of how the communication processor functions which is connected to the workstation group and the telecommunications network. It is entitled NETWORK CONCEPT.
Figure 7B:
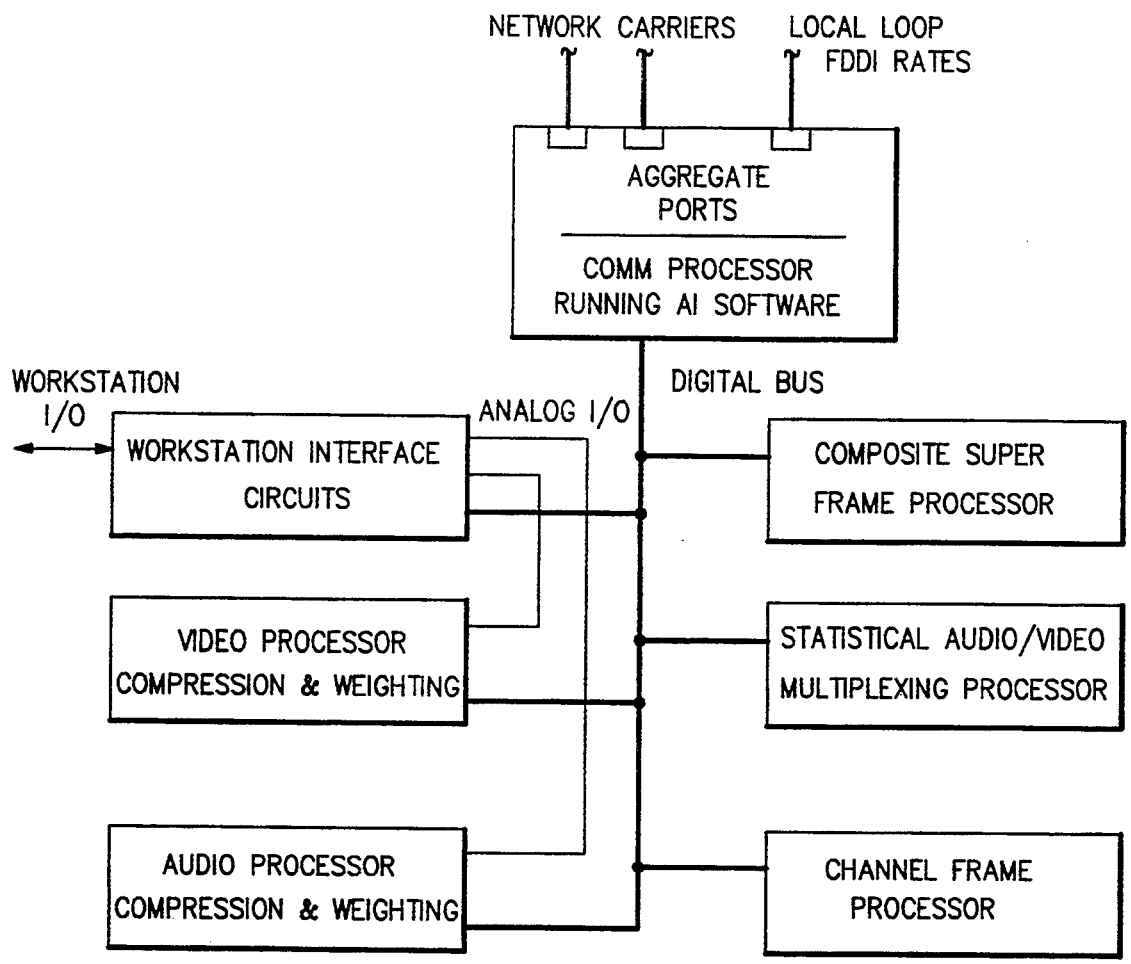
FIG. 7B describes the preferred embodiment of my invention, which is then incorporated in larger system units as described in connection with the other drawings.
Figure 9:
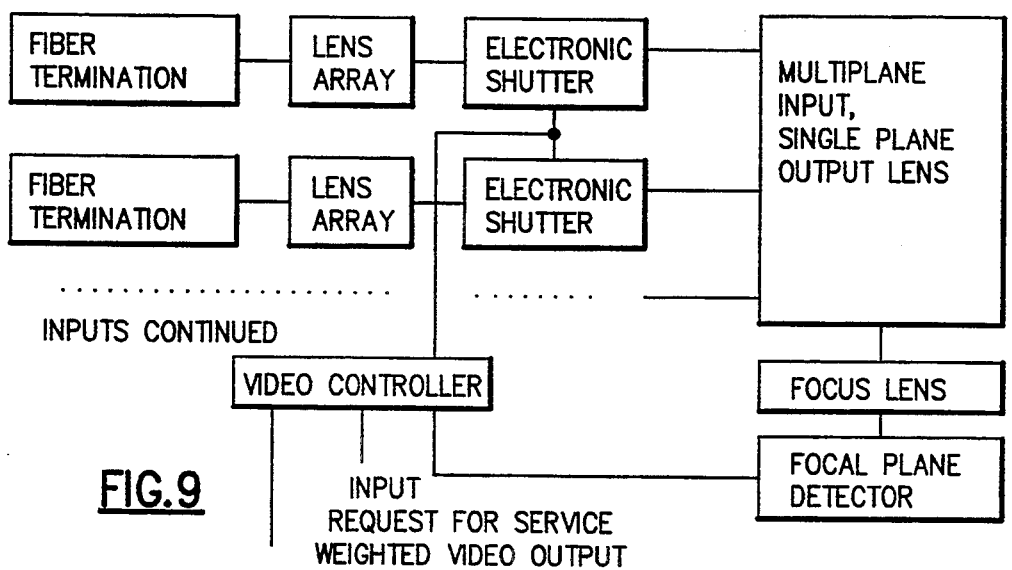
FIG. 9 illustrates the arrangement wherein the shutter is positioned to project the image onto a facet of a multi-plane input, single-plane output lens which has an output of a focusing lens array into a focal plane detector. The video controller collects the image from the focal plane detector in analog form and converts the signal to digital format.
Figure 14:
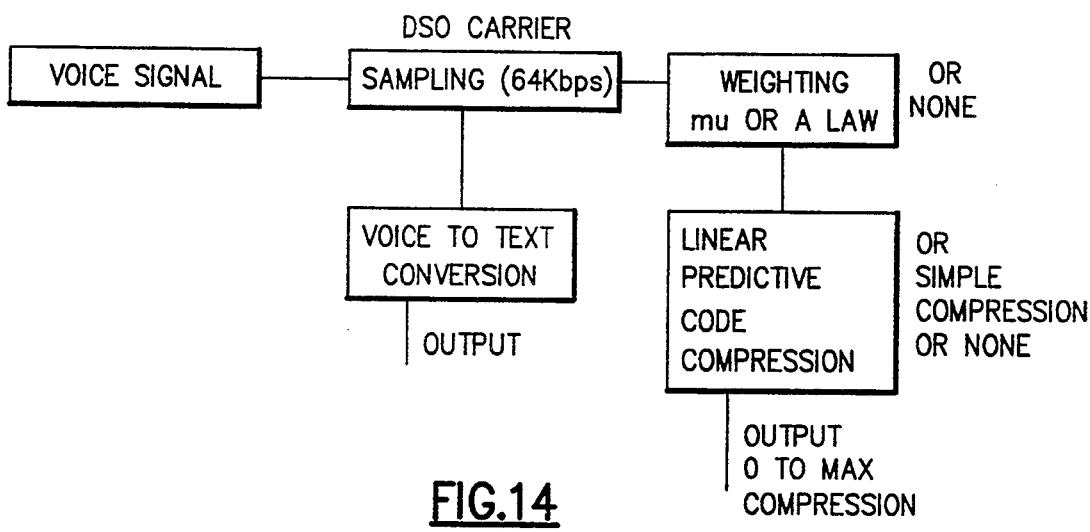
FIG. 14 shows a possible approach to processing voice signals. The approach is to initially treat the voice as a 64 kBps PCM signal with either mu-law or a-law weighting prior to doing any compression or weighting on the signal, it the carrier is at T1 rates or higher and activity is light. If the bandwidth is not required to be reduced then the voice signal needs no further audio bandwidth reduction processing although the audio may still be subjected to TASI (Time Assigned Speech Interpolation) processing. TASI works with the video processing section in the trading of allocated bandwidth between audio and video. The figure is entitled AUDIO FORMULATION FOR A PACKET.
Figure 15:
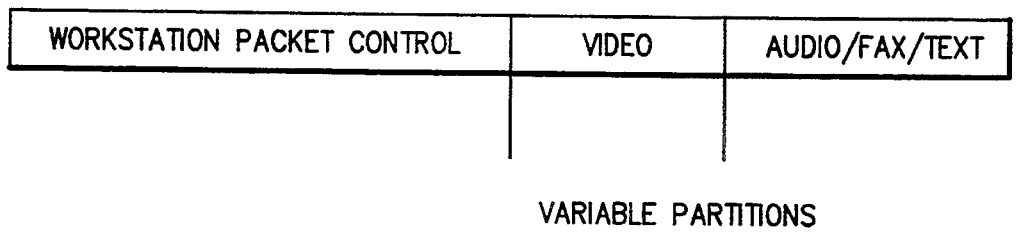
FIG 15 shows how voice may be replaced by a fax signal or text in the channel packet. Since fax is audio band representation of an image. A complex image may be transmitted from workstation to workstation using the fax invention.

The Communication Processor may be connected to the workstation over high quality coaxial cable. The cable is split into several frequency management units using frequency division multiplexing. This will permit the cable to be loaded with duplex voice, receive simplex video With feedback, duplex data, and duplex network control data. FIG. 14 shows how voice is processed at the pso level. The FIG. 7A shows the general configuration of an overall network of the unit of the system for the audio video communication processor shown in FIG. 7B. Generally, it will be seen that the system provides one or more communications processors to service a group of workstations with audio and video transmission processing for the purpose of providing video conferencing.

The communication processor utilizes artificial intelligence software to read the connection. Conversion rules contained in tables so that the system can react to the communications environment. The system is coupled for processing optical signals for low cost communication and video conferencing with audio and video communications within the facility area and for long haul transmission. The communication processor provides audio and video communications under instantaneous constraints of the transmission medium and instantaneous degree of loading or usage. Bandwidth, resolution and transmission rate are adjustable to fit the constraints at the time a request for service is made. A workstation initiates a request for service. A request for service includes data about the nature or type of service and signal destination. This information is sufficient for the communication processor to make several attempts to threads before an affirmative determination can be made. If an affirmative determination is not possible, then the communication processor will determine which is possible and provide an output to the user for possible changes in a request. With respect to FIG. 7B it will be seen that the audio video communication processor has network ports, a local port, and the communication processor unit of the system which is provided by the additional units connected to the system digital bus. Connected to the bus is a composite super frame processor, a statistical audio/video multiplexing processor, a channel frame processor and the workstation subprocessors which include the video processor with weighting and compression, the audio processor with compression and weighting and the workstation interface circuits. These workstation subprocessors have both analog and digital interconnections. The system has a telephone type interface port for connection of workstations as part of the overall system.

The telephone type interface is a unique concept in that it allows stand alone devices such as facsimile to interface with workstations. Workstation can run fax emulation software by which documents in electronic form are converted to a fax signal and sent to distant facsimile equipment. The telephone interface is used to support packetized audio on the network. The telephone type interface can accept telephone signaling information and originate signaling information.

Workstation voice signals are accepted by the communications processor. One of N voice input lines is accepted by multiplexing for processing. Sampling is performed at 64 Kbps to be compatible with existing practice (first level DS0 carrier). The weighting can be either mu law or A law. The CommunicationProces automatically perform conversion between mu law and A law when the routing table description indicates conversion is necessary as in the case of transatlantic videoconferencing. After weighting, the signal is processed further to lower the transmission rate and assemble the resultant data into a numerical sequence suitable for a packetized network. The rate at which the packets are transmitted is dependent on network loading. The Communication Processor network is not intended to compete against the telephone network, but rather to add voice to video, but the option to select voice only is included.

A note about telephone type voice bandwidth. The rate of 64,000 Bps is the result of a Nyquest sampling rate of 8,000 samples per second. Each sample is 8 bits of binary data. Two to the eighth power is the decimal value 256. Since the electrical voice signal should be symmetrical around the zero voltage axis, 256 is partitioned into +128, −127 and 0. The sum of these position holding numbers is 256. This means that a full 4,000 hertz of signal bandwidth is available for voice. The type 500 handset commonly used in a telephone apparatus has a nominal bandwidth of 3,000 hertz. The first limiting filter is then the handset. A handset or headset that is part of the communication proces group will not be so limited, it will have a nominal 4,000 hertz high fidelity voice bandwidth. FIG. 14 shows how a packet for audio would be formulated for video conferencing. The process labeled Linear Predictive Code Compression (LPC) can reduce the voice data bandwidth to as low al 1,200 Bps serial rate. This voice has poor quality concerning elements such as speaker recognition and lost words causing speech to be repeated when the transmission medium performs poorly. Since the medium is expected to have high quality, the only degradation in 1,200 Bps speech is from the algorithm. Voice will be processed at 2,400 Bps LPC and 16,000 or 32,000 Bps Adaptive Differential Pulse Code Modulation (ADPCM) as well as 64,000 Bps PCM. The choice depends on the available bandwidth, the user request, and compatibility at the distant end. These factors are kept track of by the artificial intelligence software running on the communication processor. FIG. 4 shows how variable partitioning is used. Variable partitioning reduces redundant processing and saves bandwidth space.

The audio can be replaced by fax signal, when facsimile is requested. The bezel, or workstation adapter has an input for fax signals. The communication processor does not generate fax signals, but one side of the workstation, not related to the communication processor interface adapter, may generate them. Dynamic allocation of bandwidth is based on audio as the first priority when the signal is fax, given the network loading. Periods of audio inactivity are used to transmit video. Audio is dynamically compressed from the 64,000 Bps using a good predictive compression algorithm. Voice data rate expectations are 2,400 to 1,200 Bps. Audio compression may also be zero, so the rate would DS0 or 64,000 Bps as would be the case for fax signals. The workstation packet control section is likewise dynamic. If the information is redundant, previous packet repeat semaphores are used to convey this information.

The CommunicationProcessor is required to collect all the fax packets before sending them on to the workstation. Fax packets are not permitted to be discarded as is possible in audio or video packets. A buffer may be required for this function. Voice processing requires a buffer also. The video signal does not require a buffer. A video packet may be discarded if required. The workstation will not assemble a new frame unless the frame is complete and intact. I recognized that there is a need to enhance the hardware for video images among a plurality of teleconferencing stations over telephone lines, something that U.S. Pat. No. 4,682,225 did not address.

My communication processor with the video processor discards picture elements or pels. They are discarded because the receiving station has requested a window size for the video. Pels that do not have an address in the window as determined by an addressing algorithm are discarded. That is the first step in reducing unnecessary bandwidth. All pels that have an address in the distant end window will be processed by compression or weighting. No single representative pel is used to represent a group of pels.

Fourth Element of Distinction, Network Management Specifications

The key to CommunicationProcessor concept is to embed network standards compatibility between various transmission systems (standards bridge). The T carrier system is common and tariffs are available for this service. T carriers may be used in ISDN networks. The Synchronous Optical Network (SONET) uses a different multiplex scheme and which could also carry ISDN signals. The lowest level is OC-1 at 51.84 Mbps. This level may be used for the local area transmission access (LATA) loop or as a feed long haul networks. It will provide a great deal of capacity for high quality communications and is the preferred carrier. The Communication Processor must be compatible with signalling techniques such as DS2/DS3. The Communication Processor will not interface to a telephone switch at any level, but wide area network transmission equipment may look for the signaling pattern and could substitute network routing information momentarily. The artificial intelligence software by virtue of knowledge of tariffs will know when a carrier is capable of this and thus not permit crucial control information to allocated those bit positions that are most susceptible. This feature is also true of the ISDN Bearer channel.

Figure 16:
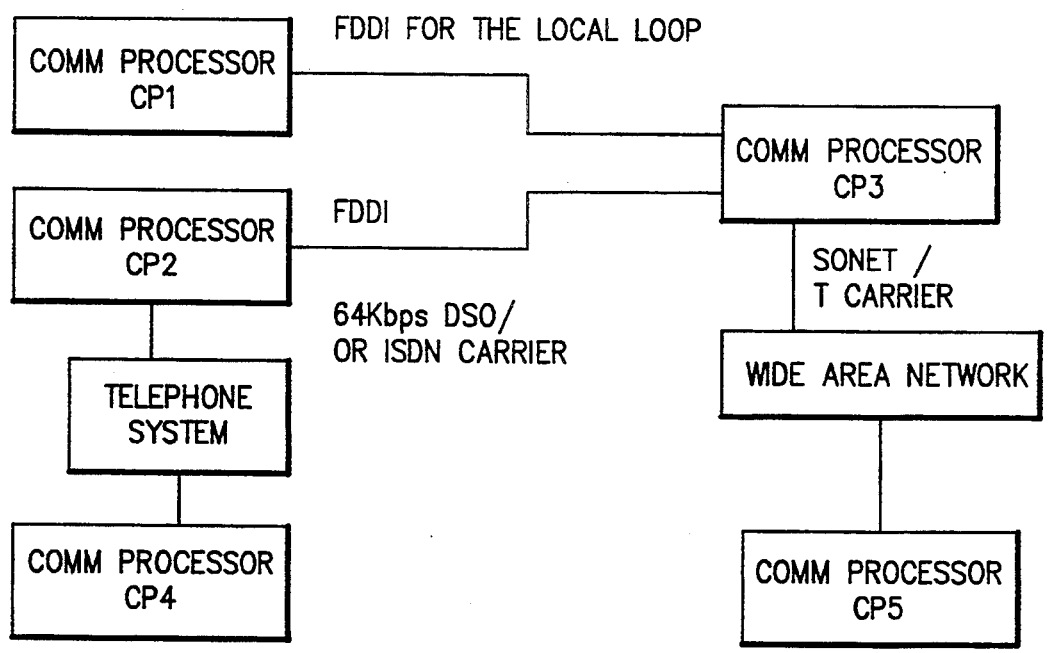
FIG. 16 illustrates how communication processors are interconnected.

For local loop operations, those co-located at a facility, an FDDI carrier is the preferred choice. Reliance on a telecommunications network carrier would not be required for this choice. FIG. 16 shows how the local loop and the telecommunications network differ. Also it is possible for regional carrier to offer a 64,000 Bps carrier from the telephone system but not a telephone circuit. Such a circuit would most likely be inserted and dropped by a DACS machine prior to the T-1 carrier connecting to the telephone switches.

Consider the connectivity case of FIG. 16. The instantaneous constraints of CP2 to CP4 are dramatically different from those of CP3 to CP5. The services available from CP2 to CP4 are correspondingly reduced. CP2 may be using a dedicated DS0 circuit. Other possibilities are an ISDN interface. Each has its own characteristics, throughputs and protocol. The Communication Processor is capable of interfacing each on the network aggregate side. The key to this is the artificial intelligence software which keeps track of which tariff offering is connected to which network port with all its capability and limitations.

Figure 17:
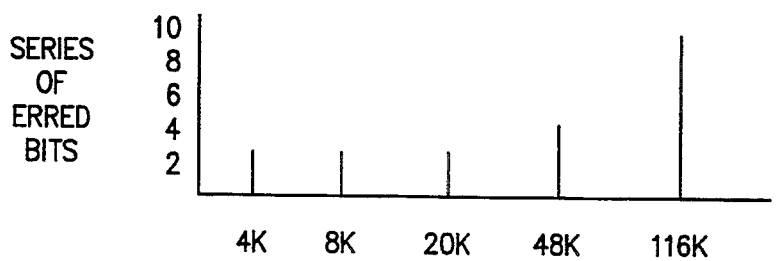
FIG. 17 illustrates changes in error bits with respect to block size.

The Communication Processor must also maintain circuit information, a history file network circuit attributes such as bit error rate and error free seconds in order to select an error correcting code that will result in the least transmission overhead. The code that is selected is sent in the packet control portion of the frame. Expert rules are made to take into account error statistics. If the bit error rate is at least 10-5 or better and or if the error free seconds is 10 or better then, ECC may not be used. Note that the distribution of error has more impact than the magnitude of BER in selecting a suitable ECC. Refer to FIG. 17. The Communication Processor is opportunistic, an analogy similar to meteor burst communications, the Communication Processor can take advantage of good propagation time to up the transmission rate by reducing the overhead. FIG. 17 is an example of error data statistics which could be collected by the communication processor. FIG. 17 shows how the size of a block can effect the quality of transmission. Automatic repeat request is a parameter that can be measured. Also a given protocol can keep track of the number of times it must intervene to replace an error bit. The communication processor can keep track of these statistics and make changes to the protocol selection for maximum data bandwidth and reasonably good quality.

Expert communications processing (AI) will require consideration of error statistics. A key factor of throughput performance is connection quality. Bit error rate alone is insufficient to select a suitable error correcting code (ECC). Error free seconds (EFS) and error distribution over packet size are required in addition to BER. It is important that the Communication Processor measure these values and keep a history of them per network port. Selection of block size would also be decided in conjunction with ECC.

Consider the following example for illustration. A derivative key factor to compute is the through put per block size, which must includes factoring in the dynamic block growth from adding in ECC. In FIG. 17 for example, the block size grows geometrically to add in a candidate ECC (other ECCs may grow arithmetically, or linearly). In FIG. 17 the history of a network port is shown. The statistics are such that on a 50% average, a 116 k size block contains one sequence of 7 continuous erred bits. That means one of two blocks is corrupted. If an ECC has performance such that 6 erred bits can be rectified in any sequence including continuous sequence, then that ECC would be chosen along with a smaller 48 k block size as suitable for present conditions. ECC is only applied against control information. Audio or Video data do not receive ECC. However the statistics of error for the control information apply equally well to voice and video data when computing block size. When the situation is such that ECC is no longer effective, then dynamic evaluation of the connection is required such that the call may be terminated prior to normal service completion on account of unsatisfactory performance. A call may be attempted several times per hour with the intention of collecting statistical information when bandwidth space is available. These call attempts are not necessarily initiated by a user, but may be based on prior usage patterns. The statistics of the attempts are stored and used in calculating success of ECC types as a probability of success for future attempts.

A summary of the network management plan shows the key plan elements.

1) Descriptor table for each network port side interface, all parameters and characteristics of the tariff service.

2) Jobs in service table which contains all the parameters effecting service.

3) Request for service table (proposed in service channels), queued by time of arrival, bandwidth request and complexity of connection.

4) Quality performance table (contains measured performance statistics and computed statistics) for each network port.

5) Computation of required services, and customized requests for each user in a performance table that will effect each request in a table (for adding new channels).

6) Computation of limits of performance table of aggregate frame per network interface port. (System stops)

7) Model of each of the current aggregate ports along with data collected for the purpose of projection bandwidth requirements and for computing bandwidth allocations. Develops all the primary parameters required by the subprocessors.

OTHER FEATURES

It is a feature of the invention that my communication processor shares the video subprocessor in the communication processor with several users method of sharing is not important, for example analog switching into one A/D or discrete A/D per workstation user connection. However the processing of video using weighting or compression of several users is performed by one communication processor with the subordinate help of a video processor for all users.

The communication processor uses a video subprocessor to perform the work of selecting the picture elements from each user according to the specifications determined by the communication processor. The video subprocessor always strives from maximum bandwidth reduction so as to leave transmission capacity available for the next potential user. The video is either compressed or weighted depending on conditions. Weighted means that the allocated dynamic range of the picture element is reduced to an active dynamic range which in practice will be less bits the full allocated dynamic range. For example if 12 bit positions repres the full range and the pel exhibits range fluctuations of 4 bit positions then only the 4 bits is transmitted. A special protocol is used to tell the receiving side which 4 out of the allocated 12 are being transmitted. Each pel also has a specific address in the workstation video memory plane. Therefore no information is required to be transmitted for vertical or horizontal synchronization. The communication processor has little need to worry about compression or the techniques for such compression. Compression can be achieved by hardware or by software, and the kind of compression is not important to the invention.

I note also that unlike U.S. Pat. No. 4,733,299, my system has traffic types that are same. The communication processor is not concerned with progressive or interlac scanned video images, but rather video data. Some workstation may be using interlaced video and others progressive video. All the users of the communicati processor are performing video conferencing regardless of scan type. The basic video conferencing structure of the combined side frame is the same for all users with the exception that some users may have more bandwidth allocated to them that others. There are several reasons for this, but when a connection is made, the bandwidth is allocated for the duration of the session. There may be momentary variations in the bandwidth of either the audio or video, but they will be not a factor to the user. Each user has a channel in a combined side frame which can only be decoded by another communication processor. The communication processor will ideally use high speed digital carriers like T1 and other type carriers on the combined side, but they cannot be processed as DS1, DS2, or DS3 carriers by transmission equipment such as a Digital Access cross Connect to connect to voice or data switches. They cannot be processed as variable fractional T1 service either. If the combined side service is fractional T1, then it must be a fixed fractional service.

Consider the possibility of series of lenses is used to focus the image onto the end of a fiber optic cable connected to the Communication Processor. The quality of the fiber is distinct from those that carry high speed binary data. The fiber is required to maintain the focal plane rectilinear spatial image without precise regard to time dispersion along the Z-axis. There are in existence fiber lenses that exhibit a large focal plane then gradually taper the lens diameter into the cable diameter. The cable terminates at the Communication Prococessor into a lens array and electronic shutter. The shutter is positioned to project the image onto a facet of a multiplane input, single plane out lens (complex prism). The output of the complex prism is a focusing lens array into the focal plane detector. FIG. 11 shows weighting.

The Video Controller selects the electronic shutter in multiplex sequence and collects the image from the Focal Plane Detector (CCD) in analog form and converts the signal to digital format. CCD high speed performance makes possible the cost advantage of servicing several users asynchronously, but isn't necessary to Communication Processor performance.

While I have described the preferred embodiments of my invention, it will be understood that those skilled in the art, both now and in the future, may make various improvements and enhancements which fall within the scope of the claims which follow. These claims should be construed to maintain the proper protection for the invention first disclosed.

What is claimed is:

1. An audio video communication processor system for coupling workstation units in a system which transmits audio and video information over a carrier, comprising:
   a communication processor having a digital bus for intercoupling elements coupled to the communication processor, said communication processor having a plurality of network interface ports including a port for a network carrier signal and a port for a local loop carrier signal, means for transmitting information carried by the port carrier signals from one network port to another network port and from a coupled workstation to a network port;
   a workstation interface, a video processor and an audio processor for processing video and audio information at a workstation level, said workstation interface, said video processor and said audio processor being interconnected to pass digital and analog signals therebetween and for passing digital information via said digital bus to said communications processor;
   a channel frame processor connected to said digital bus for controlling communication over said digital bus; and
   a statistical audio/video multiplexing processor connected to said digital bus for dynamically changing an allocation of bandwidth bits between audio and video information signals on the digital bus based on changes in an amount of activity of the audio or video signals during a transmission of the audio and video information signals.

2. An audio video communication processor system according to claim 1 wherein the audio processor has a voice compression/weighting subprocessor shared by several users coupled to the communication processor system.

3. An audio video communication processor system according to claim 2 wherein the audio processor has means for performing compression and weighting based on an allocatable bandwidth provided by a user of the system and based upon a decision made by the communication processor to allocate final bandwidth process control for the requested bandwidth.

4. An audio video communication processor system according to claim 1 where the video processor has a video compression/weighting subprocessor shared by several users coupled to the communication processor system.

5. An audio video communication processor system according to claim 4 wherein the video processor has means for compressing video information and subject to control from the communication processor based on video activity and allocatable bandwidth and weighting provided by a user of the system and based upon a decision made by the communication processor to allocate final bandwidth process control for the requested bandwidth.

6. An audio video communication processor system according to claim 4 further comprising an image capture camera for outputting digital video to the communication processor through the workstation interface.

7. An audio video communication processor system according to claim 4 further comprising a voice encoding processor for providing digital voice capability.

8. An audio video communication processor system according to claim 4 further comprising a statistical audio/video multiplexing processor shared by several users of the system for performing modelling of the communications channel and usage situation and computing parameters for channel transmission in the system.

9. An audio video communication processor system according to claim 4 wherein said channel frame processor may be coupled to be shared among users for assembling a channel frame for insertion into an aggregate frame.

10. An audio video communication processor system for coupling workstation units in a network system which transmits and receives audio and video information signals over a carrier, comprising:
   a communication processor having a digital bus for intercoupling elements coupled to the communication processor; and
   a statistical audio/video multiplexing processor connected to said digital bus for dynamically changing an allocation of bandwidth bits between the audio and video information signals on the carrier, based on changes in an amount of activity of the audio or video information signals during a transmission of the audio and video information signals.

11. An audio video communication processor system for coupling workstation units in a network system which transmits and receives audio and video information signals over a carrier, comprising:

a communication processor having a digital bus for intercoupling elements coupled to the communication processor;

means for receiving a different network carrier signals;

means for transmitting and receiving audio and video information over the network system, said means for transmitting and receiving audio and video information including means for translating from one network carrier signal type to another network carrier signal type; and means for dynamically changing an allocation of bandwidth bits between said audio and video information signals on the digital bus based on changes in an amount of activity of the audio or video information signals during a transmission of the audio and video information signals.

12. An audio video communication processor system according to claim 11 further comprising a workstation console audio/video interface.

13. An audio/video communication processor system according to claim 11 further comprising a video weighting subprocessor.

14. An audio/video communication processor system according to claim 11 further comprising a weighting and compression subprocessor for audio and video signals.

15. An communication processor system according to claim 13 further comprising a weighting and compression subprocessor for audio and video signals coupled to the communication processor system for frame encoding and for allocating audio with the video frame signal.

16. An audio/video communication processor system according to claim 11 further comprising a means for allocating information relating to audio and video signals to a channel location as a super frame.

17. An audio/video communication processor system according to claim 11 wherein the communication processor has a look up table for providing the knowledge necessary for the communication processor to decide the parameters under which it will accept and implement a user request for service.

18. An audio video communication processor system for coupling workstation units in a system which transmits audio and video information over a carrier, comprising:

a communication processor having a digital bus for intercoupling elements coupled to the communication processor, said communication processor having a plurality of network interface ports including a port for a network carrier signal and a port for a local loop carrier signal, means for transmitting information carried by the port carrier signals from one network port to another network port and from a coupled workstation to a network port;

a workstation interface, a video processor and an audio processor for processing video and audio information at a workstation level, said workstation interface, said video processor and said audio processor being interconnected to pass digital and analog signals therebetween and for passing digital information via said digital bus to said communications processor, said video processor including a video compression/weighting subprocessor shared by several users coupled to the communication processor system;

a channel frame processor connected to said digital bus for controlling communication over said digital bus;

a statistical audio/video multiplexing processor connected to said digital bus for dynamically allocating bandwidth between audio and video information signals on the digital bus; and a composite super frame Processor common to all users, one per port for implementing a language of the telecommunications interface.

19. An audio video communication processor system for coupling workstation units in a system which transmits audio and video information over a carrier, comprising:

a communication processor having a digital bus for intercoupling elements coupled to the communication processor, said communication processor having a plurality of network interface ports including a port for a network carrier signal and a port for a local loop carrier signal, means for transmitting information carried by the port carrier signals from one network port to another network port and from a coupled workstation to a network port;

a workstation interface, a video processor and an audio processor for processing video and audio information at a workstation level, said workstation interface, said video processor and said audio processor being interconnected to pass digital and analog signals therebetween and for passing digital information via said digital bus to said communications processor, said video processor including a video compression/weighting subprocessor shared by several users coupled to the communication processor system;

a channel frame processor connected to said digital bus for controlling communication over said digital bus; and a statistical audio/video multiplexing processor connected to said digital bus for dynamically allocating bandwidth between audio and video information signals on the digital bus, said communication processor including means for executing artificial intelligence (AI) software, common users to which all other system processor elements are subservient, for synthesizing implementation parameters of digital language modulation conversion from one channel in an aggregate frame to reproduce the channel in another aggregate frame and for setting up conditions of facsimile usage, for threading channels to establish connections between system elements for connection of workstations operation with said system.

20. An audio video communication processor system for coupling workstation units in a network system which transmits and receives audio and video information over a carrier, comprising:

a communication processor having a digital bus for intercoupling elements coupled to the communication processor;

means for receiving a different network carrier signals;

means for transmitting and receiving audio and video information over the network system, said means for transmitting and receiving audio and video information including means for translating from one network carrier signal type to another network carrier signal type; and means for coordinating video frame information with audio and control information to interrelate the audio and video information transmittal under request of a user and under control of the communications processor to intercouple the different elements of the system for common interconnected usage, said communication processor including a feedback control loop to an illumination device of a display device for the workstation for controlling signal to noise at the source.

* * * * *